United States Patent
Malvankar et al.

(10) Patent No.: US 11,755,998 B2
(45) Date of Patent: Sep. 12, 2023

(54) SMART DATA ANNOTATION IN BLOCKCHAIN NETWORKS

(71) Applicant: International Business Machines Corporation, Armonk, NY (US)

(72) Inventors: Abhishek Malvankar, White Plains, NY (US); Shikhar Kwatra, Durham, NC (US); Jeronimo Irazabal, Roque Perez (AR); Kushal S. Patel, Pune (IN)

(73) Assignee: International Business Machines Corporation, Armonk, NY (US)

( * ) Notice: Subject to any disclaimer, the term of this patent is extended or adjusted under 35 U.S.C. 154(b) by 527 days.

(21) Appl. No.: 16/876,456

(22) Filed: May 18, 2020

(65) Prior Publication Data

US 2021/0357859 A1    Nov. 18, 2021

(51) Int. Cl.
    *G06F 16/93*     (2019.01)
    *G06F 16/182*    (2019.01)
    *G06F 16/27*     (2019.01)
    *G06Q 10/10*     (2023.01)

(52) U.S. Cl.
    CPC ......... *G06Q 10/103* (2013.01); *G06F 16/182* (2019.01); *G06F 16/27* (2019.01); *G06F 16/93* (2019.01)

(58) Field of Classification Search
    None
    See application file for complete search history.

(56) References Cited

U.S. PATENT DOCUMENTS

| | | | |
|---|---|---|---|
| 7,028,038 B1 | 4/2006 | Pakhomov | |
| 10,022,613 B2 | 7/2018 | Tran et al. | |
| 10,977,518 B1 * | 4/2021 | Sharma | G06V 10/764 |
| 2004/0260714 A1 * | 12/2004 | Chatterjee | G06F 16/907 |
| 2011/0238584 A1 * | 9/2011 | Ikavalko | G06F 16/374 |
| | | | 707/769 |
| 2012/0159391 A1 * | 6/2012 | Berry | A61B 5/4824 |
| | | | 715/823 |
| 2017/0199963 A1 | 7/2017 | Kondadadi et al. | |
| 2019/0314726 A1 | 10/2019 | Masini | |
| 2020/0092091 A1 * | 3/2020 | Muller | G06F 21/602 |
| 2020/0381087 A1 * | 12/2020 | Ozeran | G16H 10/60 |

FOREIGN PATENT DOCUMENTS

| | | | | |
|---|---|---|---|---|
| CA | 2841472 A1 * | 8/2014 | ......... | G06F 17/248 |
| CN | 108881160 A | 11/2018 | | |
| CN | 109445948 A | 3/2019 | | |
| JP | 2018533103 A | 11/2018 | | |
| WO | 2018200274 A | 11/2018 | | |

OTHER PUBLICATIONS

"Making AI Possible with Right Data and Image Annotation Services," Anolytics, Printed May 11, 2020, 5 pages.

"Data Annotation Tools Market Size, Share & Trends Analysis Report by Type (Text, Image/Video, Audio), by Annotation Type (Manual, Automatic, Semi-supervised), by Vertical, by Region, and Segment Forecasts, 2020-2027," Grand View Research, Published Mar. 2020, Report ID: GVR-2-68038-938-8, 7 pages.

\* cited by examiner

*Primary Examiner* — Mohamed Ibrahim
(74) *Attorney, Agent, or Firm* — Jared C. Chaney

(57) ABSTRACT

An example operation may include one or more of: receive a first set of annotation information, determine a first approval decision for the first set of annotation information, record the first approval decision in a blockchain, retrieve a first set of approval decisions from the blockchain, generate a consensus based on the first set of approval decisions, and record the consensus in the blockchain.

20 Claims, 19 Drawing Sheets

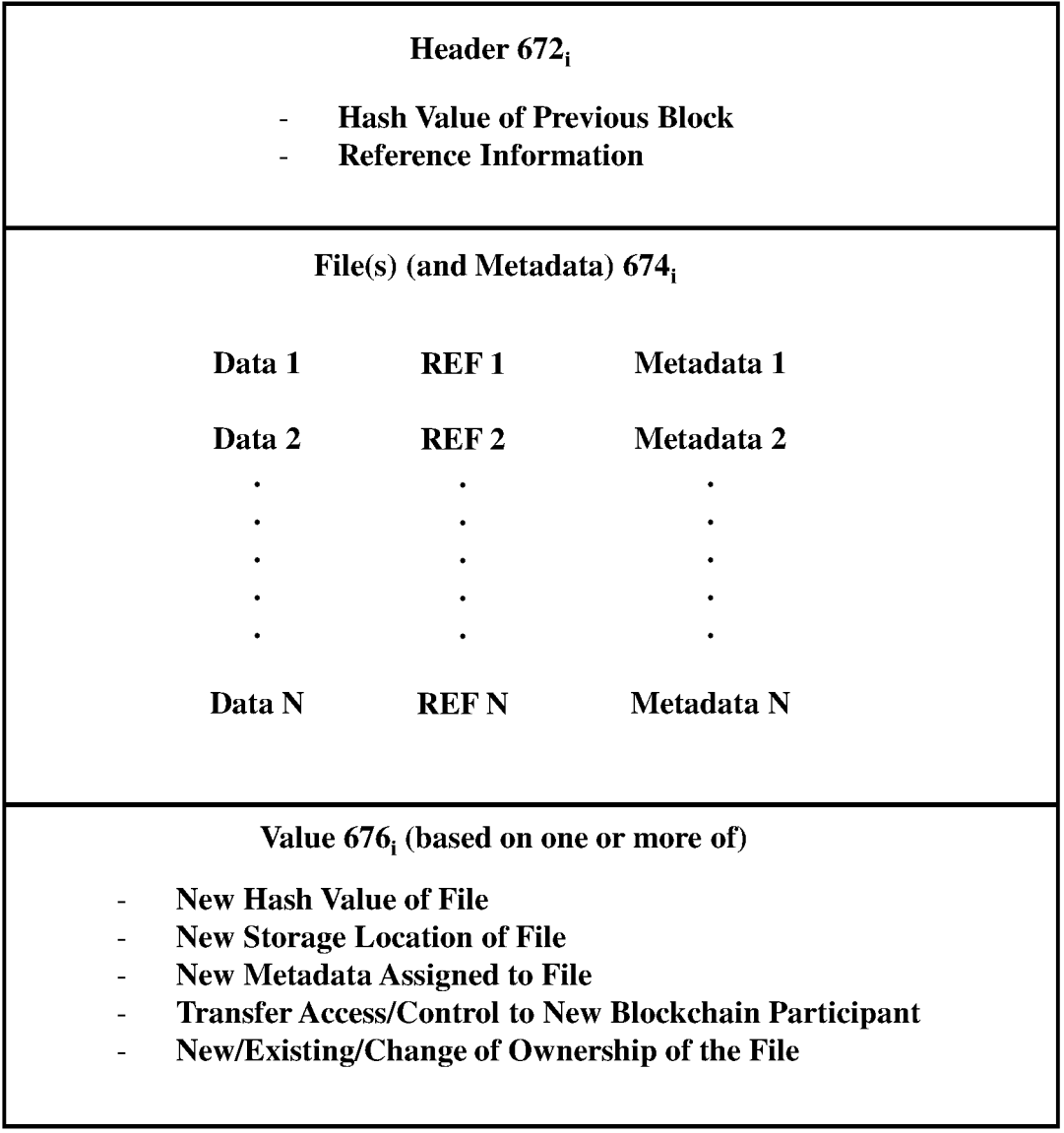

Block$_i$

Header 672$_i$

- Hash Value of Previous Block
- Reference Information

File(s) (and Metadata) 674$_i$

| Data 1 | REF 1 | Metadata 1 |
| Data 2 | REF 2 | Metadata 2 |
| . | . | . |
| . | . | . |
| . | . | . |
| . | . | . |
| . | . | . |
| Data N | REF N | Metadata N |

Value 676$_i$ (based on one or more of)

- New Hash Value of File
- New Storage Location of File
- New Metadata Assigned to File
- Transfer Access/Control to New Blockchain Participant
- New/Existing/Change of Ownership of the File

FIG. 6D

SMART DATA ANNOTATION IN BLOCKCHAIN NETWORKS

BACKGROUND

The global data annotation tools market size was valued at USD 390.1 million in 2019 and is projected to register a compound annual growth rate (CAGR) of 26.9% from 2020 to 2027. Increasing adoption of data annotation tools in the automotive, retail, and healthcare sectors is a key factor driving the market. These tools enable users to enhance the value of data by adding attribute tags to it or labeling it.

Data annotation is expected to play a major role in enhancing the applications of artificial intelligence (AI) in the healthcare sector. AI-backed machines use machine vision or computer vision in medical imaging data technologies to sense patterns and identify possible injuries, which assists medical practitioners in automatically generating reports after the individual is examined. Databases (such as those containing CT scans, MRI scans, and X-Ray images) can be easily screened by the AI to determine various injuries. Data annotation tools help train AI systems in differentiating data obtained from normal and injured medical images to generate reports for the examined individuals.

Technologies such as Internet of Things (IoT), Machine Learning (ML), robotics, advanced predictive analytics, and AI generate massive data. With changing technologies, data efficiency proves to be essential for creating new business innovations, infrastructure, and economics. These factors have significantly contributed to the growth of the market. With the widening scope of growth in data labelling, companies developing AI-enabled healthcare applications are collaborating with data annotation tool companies to provide the required datasets that can assist them in enhancing their machine learning and deep learning capabilities.

SUMMARY

One example embodiment provides a system that includes a processor and memory, wherein the processor is configured to perform one or more of receive a first set of annotation information, determine a first approval decision for the first set of annotation information, record the first approval decision in a blockchain, retrieve a first set of approval decisions from the blockchain, wherein the first set of approval decisions includes the first approval decision, generate a consensus based on the first set of approval decisions, and record the consensus in the blockchain.

Another example embodiment provides a method that includes one or more of receiving a first set of annotation information, determining a first approval decision for the first set of annotation information, recording the first approval decision in a blockchain, retrieving a first set of approval decisions from the blockchain, generating a consensus based on the first set of approval decisions, and recording the consensus in the blockchain.

A further example embodiment provides a non-transitory computer readable medium comprising instructions, that when read by a processor, cause the processor to perform one or more of receive a first set of annotation information, determine a first approval decision for the first set of annotation information, record the first approval decision in a blockchain, retrieve a first set of approval decisions from the blockchain, wherein the first set of approval decisions includes the first approval decision, generate a consensus based on the first set of approval decisions, and record the consensus in the blockchain.

BRIEF DESCRIPTION OF THE DRAWINGS

FIG. 6D illustrates a block which may represent the structure of blocks in the blockchain, according to example embodiments.

DETAILED DESCRIPTION

Figure 1:
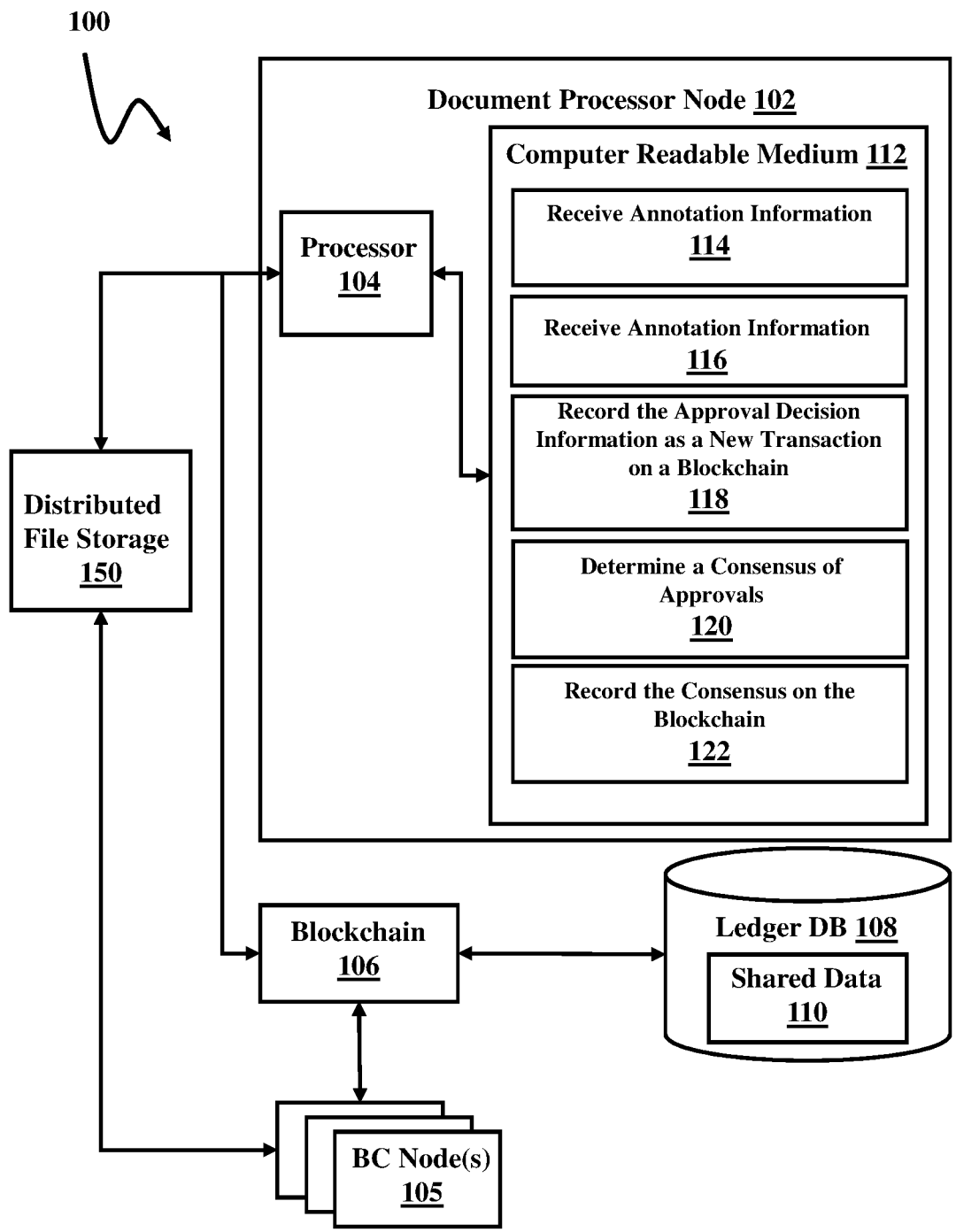
FIG. 1 illustrates a network diagram of a system including a database, according to an example embodiment.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined or removed in any suitable manner in one or more embodiments. For example, the usage of the phrases "example embodiments," "some embodiments," or other similar language, throughout this specification refers to the fact that a particular feature, structure, or characteristic described in connection with the embodiment may be included in at least one embodiment. Thus, appearances of the phrases "example embodiments," "in some embodiments," "in other embodiments," or other similar language, throughout this specification do not necessarily all refer to the same group of embodiments, and the described features, structures, or characteristics may be combined or removed in any suitable manner in one or more embodiments. Further, in the diagrams, any connection between elements can permit one-way and/or two-way communication even if the depicted connection is a one-way or two-way arrow. Also, any device depicted in the drawings can be a different device. For example, if a mobile device is shown sending information, a wired device may also be used to send the information.

In addition, while the term "message" may have been used in the description of embodiments, the application may be applied to many types of networks and data. Furthermore, while certain types of connections, messages, and signaling may be depicted in exemplary embodiments, the application is not limited to a certain type of connection, message, and signaling.

Example embodiments provide methods, systems, components, non-transitory computer readable media, devices, and/or networks, which provide for smart data annotation in blockchain networks.

In one embodiment the application utilizes a decentralized database (such as a blockchain) that is a distributed storage system, which includes multiple nodes that communicate with each other. The decentralized database includes an append-only immutable data structure resembling a distributed ledger capable of maintaining records between mutually untrusted parties. The untrusted parties are referred to herein as organizations, peers, or peer nodes. Each peer maintains a copy of the database records and no single peer can modify the database records without a consensus being reached among the distributed peers. For example, the peers may execute a consensus protocol to validate blockchain storage transactions, group the storage transactions into blocks, and build a hash chain over the blocks. This process forms the ledger by ordering the storage transactions, as is necessary, for consistency. In various embodiments, a permissioned and/or a permissionless blockchain can be used. In a public or permission-less blockchain, anyone can participate without a specific identity. Public blockchains can involve native cryptocurrency and use consensus based on various protocols such as Proof of Work (PoW). On the other hand, a permissioned blockchain database provides secure interactions among a group of entities which share a common goal but which do not fully trust one another, such as businesses that exchange funds, goods, information, and the like.

This application can utilize a blockchain that operates arbitrary, programmable logic, tailored to a decentralized storage scheme and referred to as "smart contracts" or "chaincodes." In some cases, specialized chaincodes may exist for management functions and parameters which are referred to as system chaincode. The application can further utilize smart contracts that are trusted distributed applications which leverage tamper-proof properties of the blockchain database and an underlying agreement between nodes, which is referred to as an endorsement or endorsement policy. Blockchain transactions associated with this application can be "endorsed" before being committed to the blockchain while transactions, which are not endorsed, are disregarded. An endorsement policy allows chaincode to specify endorsers for a transaction in the form of a set of peer nodes that are necessary for endorsement. When a client sends the transaction to the peers specified in the endorsement policy, the transaction is executed to validate the transaction. After validation, the transactions enter an ordering phase in which a consensus protocol is used to produce an ordered sequence of endorsed transactions grouped into blocks.

This application can utilize nodes that are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node which submits a transaction-invocation to an endorser (e.g., peer), and broadcasts transaction-proposals to an ordering service (e.g., ordering node). Another type of node is a peer node which can receive client submitted transactions, commit the transactions and maintain a state and a copy of the ledger of blockchain transactions. Peers can also have the role of an endorser, although it is not a requirement. An ordering-service-node or orderer is a node running the communication service for all nodes, and which implements a delivery guarantee, such as a broadcast to each of the peer nodes in the system when committing transactions and modifying a world state of the blockchain, which is another name for the initial blockchain transaction which normally includes control and setup information.

This application can utilize a ledger that is a sequenced, tamper-resistant record of all state transitions of a blockchain. State transitions may result from chaincode invocations (i.e., transactions) submitted by participating parties (e.g., client nodes, ordering nodes, endorser nodes, peer nodes, etc.). Each participating party (such as a peer node) can maintain a copy of the ledger. A transaction may result in a set of asset key-value pairs being committed to the ledger as one or more operands, such as creates, updates, deletes, and the like. The ledger includes a blockchain (also referred to as a chain) which is used to store an immutable, sequenced record in blocks. The ledger also includes a state database which maintains a current state of the blockchain.

This application can utilize a chain that is a transaction log which is structured as hash-linked blocks, and each block contains a sequence of N transactions where N is equal to or greater than one. The block header includes a hash of the block's transactions, as well as a hash of the prior block's header. In this way, all transactions on the ledger may be sequenced and cryptographically linked together. Accordingly, it is not possible to tamper with the ledger data without breaking the hash links. A hash of a most recently added blockchain block represents every transaction on the chain that has come before it, making it possible to ensure that all peer nodes are in a consistent and trusted state. The chain may be stored on a peer node file system (i.e., distributed file storage, local, attached storage, cloud, etc.), efficiently supporting the append-only nature of the blockchain workload.

The current state of the immutable ledger represents the latest values for all keys that are included in the chain transaction log. Since the current state represents the latest key values known to a channel, it is sometimes referred to as a world state. Chaincode invocations execute transactions against the current state data of the ledger. To make these chaincode interactions efficient, the latest values of the keys may be stored in a state database. The state database may be simply an indexed view into the chain's transaction log, it can therefore be regenerated from the chain at any time. The state database may automatically be recovered (or generated if needed) upon peer node startup, and before transactions are accepted.

Supervised machine learning may require labeled (e.g., annotated) data sets so that a machine can easily and clearly understand the input patterns. Data annotation is the process of labeling data in various formats such as images (for example, from cars, phones, or medical instruments), text (in English, Spanish, Chinese, etc.), audio, video, 3D models from MRIs and CAT scans, tabular data, timeseries data, LIDAR data, RADAR data, or data from other sensors. Data annotation annotates or labels content so it can be used to train a system with machine learning. Human-annotated data is the key to successful machine learning. Humans are able to use skills such as managing subjectivity, understanding intent, and coping with ambiguity to annotate complex data. By using many people to annotate data, information about seemingly arbitrary conclusions can be gathered. For example, when determining whether a search engine result is relevant, input from many people is needed for consensus. Using this structured data, machines can learn to recognize these relationships in testing and production.

However, it is difficult for organizations to come to a consensus on the annotations or to trust data annotations provided by another organization. For example, if machine learning is being used to train a system on annotating patient history at a hospital, the hospital's data may be limited, and data from a single outside source might not be trustworthy. Moreover, shorthand, data formats, and/or abbreviations may vary from hospital to hospital, and thus a system trained only with a single hospital's annotations may miss important annotations. Likewise, data received from other hospitals may contain mistakes or even may have been changed by a hacker.

Likewise, inaccuracy of data annotation tools acts as a restraint to the growth of the market. The primary challenges faced by the market are issues related to inaccuracy and the quality of labelled data. In some cases, data labeled manually may contain erroneous labels which further adds to the cost of the entire annotation process.

Meanwhile, blockchain systems store data on an immutable ledger, provide distributed and decentralized access to the immutable ledger through non-trusting participants, establish consensus requirements for agreement between the non-trusting participants such that no one entity can change the immutable ledger without agreement from others, invoke smart contracts, and the like. A blockchain is formed by a network of participants which agree to add a block (with data stored therein) to the immutable ledger. Before being added, the block is linked to a previous block on the immutable ledger thereby forming a chain. This immutable and incorruptible nature of blockchain makes it safer from falsified information and hacks. The decentralized nature also gives it the unique quality of being trustless, in that parties do not need to establish trust before they can transact safely.

Some embodiments described and depicted herein include a method and system for data annotation in blockchain networks. The exemplary embodiments solve the issues of time and trust by extending features of a database such as immutability, digital signatures and being a single consensus source for data annotations. The exemplary embodiments provide a solution for data annotation-based document sharing in blockchain-based networks. The blockchain networks may be homogenous based on the asset type and rules that govern the assets.

Blockchain is different from a traditional database in that blockchain is not a central storage, but rather a decentralized, immutable, and secure storage, where nodes must share in changes to records in the storage. Some properties that are inherent in blockchain and which help implement the blockchain include, but are not limited to, an immutable ledger, smart contracts, security, privacy, decentralization, consensus, endorsement, accessibility, and the like, which are further described herein. According to various aspects, a system for smart data annotation in blockchain networks is able to be implemented due to the immutable accountability, security, privacy, permitted decentralization, availability of smart contracts, endorsements and accessibility that are inherent and unique to blockchain. In particular, the blockchain ledger data is immutable and that provides for an efficient method for smart data annotation in blockchain networks. Also, use of the encryption in the blockchain provides security and builds trust. The smart contract manages the state of the asset to complete the life-cycle. The example blockchains are permission decentralized. Thus, each peer or organization may have its own ledger copy to access. Multiple organizations (and peers) may be on-boarded on the blockchain network. The key organizations may serve as endorsing peers to validate the smart contract execution results, read-set and write-set. In other words, the blockchain inherent features provide for efficient implementation of a method for smart data annotation in blockchain networks.

One of the benefits of the example embodiments is that it improves the functionality of a computing system by implementing a method for smart data annotation in blockchain network-bases systems. Through the blockchain system described herein, a computing system can perform functionality for smart data annotation by providing access to capabilities such as distributed ledgers, peers, encryption technologies, managed service providers (MSP), event handling, etc. As such, the blockchain is not just a database. The blockchain comes with capabilities to create a network of users and on-board/off-board organizations to collaborate and execute service processes in the form of smart contracts.

The example embodiments provide numerous benefits over a traditional database. For example, through the blockchain the embodiments provide for immutable accountability, security, privacy, permitted decentralization, availability of smart contracts, endorsements and accessibility that are inherent and unique to the blockchain.

Meanwhile, a traditional database may not be useful to implement the example embodiments because it does not bring all parties on the network, it does not create trusted collaboration and does not provide for an efficient storage of digital assets. The traditional database does not provide for a tamper proof storage and does not provide for preservation of the digital assets being stored. Thus, the proposed method for smart data annotation in blockchain networks cannot be implemented in the traditional database.

Accordingly, the example embodiments provide for a specific solution to a problem in the arts/field of data annotation, specifically, specializing one or more nodes/peers in a blockchain network into annotators/annotator nodes which can more efficiently annotate data.

In some embodiments, a three-tiered approach to smart annotating of data may be used: (a) receiving annotations from one or more annotators; (b) determining and recording an approval decision for the annotation by some or all peers;

and (c) determining and recording the consensus of the peers based on the recorded approval decisions. In each case the unmodified annotations, the approval decisions, and the consensus may be independently registered on the blockchain allowing end users to reconstruct the events.

First a qualified annotator may be on-boarded on the blockchain to annotate data (e.g., a document). In some embodiments, the annotator may be on-boarded on the blockchain by training the annotator by a user (e.g., resident doctor, etc.). In some embodiment, the annotator receives annotations from a user. The annotated data is committed to a distributed file storage. In some embodiments, only one annotator for one organization may submit the annotated data. In some embodiments, multiple annotators may submit the annotated data. The multiple annotators may be from one organization or they may be from multiple organizations.

In some embodiments, the annotation information may include a document, a document identifier (ID), a document digest, and at least one document annotation (e.g., a token/span identifier for the annotation and a label for the annotation). In some embodiments, the document may be submitted to a distributed file system and the document identifier (ID), the document digest, and the at least one document annotation may be stored on a blockchain. In some embodiments, a document identifier designates a particular document. The document identifier may include a version number and or other information that can identify a particular document. In some embodiments, the document digest is a unique digital signature for a document used to ensure the document has not been altered. A digest/hash function produces a digital summary of the information in a document called a digest. A digest provides a digital identifier for a digital document. The digest can be used to ensure that the document has not been altered. In some embodiments, a token/span identifier identifies data (such as a word or group of words) in a document. For example, a token may identify a word in a document. A span may identify a group of words in a document.

In a first example of document annotation, a first annotator may annotate (e.g., tagging a word, term or datapoint with a meaning or association for the word term or datapoint) the abbreviation "LAC" by tagging it with a meaning of "laceration" and "YOM" by tagging it with a meaning of "year old male," and a second annotator may annotate the abbreviation "LAC" by tagging it with a meaning of "licensed acupuncturist" and "YOM" by tagging it with a meaning of "year old male." In a second example of document annotation, a document may read "prescribed medication of X at 250 mg." A first annotator may annotate "prescribed medication" as a "treatment" and "250 mg" by tagging it with a category of "dosage of medication X", and a second annotator may annotate "prescribed medication" as a "prescription history" and "250 mg" by tagging it with a category of "dosage of medication X."

Annotators may submit annotation data independently to the blockchain network and the annotation data may be aggregated into evolving versions of the ledger as endorsed transactions.

A manager node (e.g., a node/peer authorized to record approvals on the blockchain network) may determine an approval decision based on the annotation data. In some embodiments, a manager node may be trained by a technical expert in a field related to the annotation (e.g., a doctor, a nurse, an information technology expert, a scientist, a cryptocurrency trader, etc.). In some embodiments, the manager node may query a technical expert in a field related to the annotation to make an approval decision on an annotation. Manager nodes may retrieve the annotation information from the ledger and/or retrieve the document from the distributed file storage. The manager node may be given authorization to approve or deny each annotation for a particular peer (e.g., annotator). In some embodiments, the approval decision may be "approve" or "deny." Following the first example from above, a first manager node may approve the annotation "year old male" for "YOM" and deny the annotation "licensed acupuncturist" for "LAC." Following the second example from above, a first manager node may approve the annotation "treatment" for "prescription medication" and approve the annotation "dosage of medication X" for "250 mg." In some embodiments, the approval decision may be a numerical score. Following the first example from above, a first manager node may give the annotation "year old male" a 90% certainty score, the annotation laceration a 90% certainty score, and the annotation "licensed acupuncturist" a 10% certainty score. Here the exemplary "certainty score" describes how certain the manager node is that the annotation is correct. Certainty scores above a pre-determined threshold (e.g., 50%) may be considered an approval. Other types of scoring are possible.

One or more of the manager nodes may record an approval decision as a transaction in the blockchain ledger for each annotation. In some embodiments, the organization associated with the manager node may be identified in the blockchain. For example, a hospital that controls or is associated with a manager node may be identified in the blockchain. In some embodiments, an identification for the manager node that determined the approval decision may be recorded. In some embodiments, the identification for the manager node may also include the doctor associated with the training of the manager node.

The system chaincode may execute one or more consensus algorithms to determine consensus of the manager nodes that have recorded an approval decision. In some embodiments, the consensus algorithm may be executed after a set trigger. For example, the trigger may be a number or percentage of manager nodes that have recorded an approval decision or a lapsed period of time with no new approval decisions being recorded. Once the consensus is achieved, the result may be committed to the blockchain. One or more manager nodes' approval decisions may be grouped into a set of approval decisions.

In some embodiments, the chaincode is constructed to allow for more annotations to be added as different manager nodes on-board for annotation. The system chaincode may again execute one or more consensus algorithms to achieve consensus of the manager nodes that have recorded an approval decision. Once the consensus is achieved, the result may be committed to the blockchain as an updated consensus. "Consensus algorithm" may refer to one of several protocols for solving the consensus problem in the field of computer science which is used to achieve agreement on a single data value among distributed processes or systems or the current state of a distributed system. Consensus algorithms may, in some cases, be primarily used to achieve reliability in a network involving multiple distributed nodes that contain the same information. In some instances, consensus algorithms may assume that some processes and systems will be unavailable and that some communications may be lost. As a result, consensus algorithms must be fault-tolerant. They typically assume, for example, that only a portion of nodes may respond but require a response from a set quantity, such as 51%, at a minimum. Some types of consensus algorithms that may be used include Proof-of-Work (PoW), Proof-of-Stake (PoS), Delegated Proof-of- Stake (DPoS), Byzantine Fault Tolerance (BFT), Practical Byzantine Fault Tolerance (PBFT), and Proof-of-Weight (PoW). Examples used herein are merely for explanation purposes and should not be construed as how an actual consensus would be determined.

In some embodiments, a subset of manager nodes may be able to form a trusted group (based on pattern history) in a specific domain, respective weightage may be increased for said manager nodes pertaining to said domain. Thus, each approval may be tagged with a particular domain and respectively the manager node's approval decisions may be given more weight when determining a consensus for a particular domain. Domains may be subjects that the annotations are associated with, such as medical practice areas or technical fields of practice. For example, if an annotated document is from a surgical department, those annotations may be associated with a surgical domain. Domains may also practice fields that the consensus may be associated with. For example, if a consensus may be used in machine learning for an acupuncture group, the consensus may be associated with an acupuncture domain. In some embodiments, manager nodes may also be associated with, or grouped by, domains. Following the first example from above, manager nodes associated with surgical organizations may approve the annotation tagging "LAC" as "laceration" while manager nodes associated with acupuncture organizations may approve the abbreviation "LAC" as "licensed acupuncturist." It may be recorded that 100% of surgical manager nodes approved the annotation tagging "LAC" as "laceration" while 100% of manager nodes associated with acupuncture organizations approved the abbreviation "LAC" as "licensed acupuncturist." Thus, the surgical manager nodes may be given more weight for further surgical domain consensuses, and the acupuncture manager nodes may be given more weight for further acupuncture domain consensuses. In some embodiments, the domain information can be extracted from documents using natural language processing NLP or information extraction modeling.

In some embodiments, annotators may also be grouped by domain. When both manager nodes and annotators belong to the same domain, the resulting approval decisions may be given more weight. Following the first example, a surgical organization manager node may be given a higher weightage in the consensus when approving a surgical annotator's annotations. In some embodiments, manager nodes associated with a first domain would only be able to record approval decisions for annotations made by annotators that are also associated with the first domain. In some embodiments, the system would make recommendations on what annotations a manager node should review based on the domain the annotator is associated with and the domain the manager node is associated with.

In some instances, as annotations are added, specific annotators may develop a pattern history of having annotations that have a high approval rate (e.g., above 90%) in a particular domain. In some embodiments, annotations provided by the specific annotators may have a respective weightage increased in those particular domains. For example, if the annotations of a first annotator have an approval rate of 95% for a surgical domain, the annotations of the first annotator that are approved may have a higher weighting for a consensus in the surgical domain group.

In some embodiments, the chaincode may be designed to determine a quality score for annotators in specific domains and inculcate a recommender system for ensuring that specific annotators are grouped in the proper domain. Quality scores may be calculated using a commonly agreed quality measurement function. In some instances, quality scores may be based on the percentage of an annotator's annotations that are approved for a domain. For example, if an average of 95% of surgical manager nodes approve a first annotator's annotations, the annotator may be given a high-quality score for a surgical domain. However, if an average of 5% of acupuncture manager nodes approve a first annotators annotations, the annotator may be given a low-quality score for an acupuncture domain. In some embodiments, the quality score may be used to recommend that a manager node in a first domain review the annotations of an annotator with a high-quality score in the first domain. For example, it may be recommended that a manager node in the surgical domain review the annotations of an annotator with a high-quality score in the surgical domain. In some embodiments, the results may be visible to all participating parties and stored in the ledger in correlation with an associated domain. In some embodiments, annotators may be scored through a linear machine learning model where features may be domain, number of times annotator achieved high consensus rate (e.g., over 90%), and as type of annotation (e.g., surgical or acupuncturist).

In some embodiments, a first set of annotations may be received from a first annotator, and a first set of approval decisions may be generated by a first set of managers. In some embodiments, the first annotator may be scored (e.g., quality score) based on an approval rate of the first set of managers for the first annotator. In some embodiment, the first set of managers are of specific domain (e.g., acupuncture), and the scoring is for the specific domain. In some embodiments, the first annotator will be scored based on an average consensus (e.g., an average of all the consensuses determined for the annotations of the annotator, an average of the most recent the consensuses determined for the annotations of the annotator, or an average of all the consensuses determined for the annotations of the annotator in a specific domain). For example, where an annotator receives a consensus of 90%, 89%, and 91%, the average consensus may be 90%. For example, where the consensus is either approved or not approved, an annotator that has 90% of its annotations approved may have a 90% average consensus. Other ways of scoring are possible.

FIG. 1 illustrates a logic network diagram for smart data annotation in blockchain networks, according to example embodiments.

Referring to FIG. 1, the example network 100 includes a document processor node 102 connected to other blockchain (BC) nodes 105 representing document-owner organizations. The document processor node 102 may be connected to a blockchain 106 that has a ledger 108 for storing data to be shared (110) among the nodes 105. While this example describes in detail only one document processor node 102, multiple such nodes may be connected to the blockchain 106. It should be understood that the document processor node 102 may include additional components and that some of the components described herein may be removed and/or modified without departing from a scope of the document processor node 102 disclosed herein. The document processor node 102 may be a computing device or a server computer, or the like, and may include a processor 104, which may be a semiconductor-based microprocessor, a central processing unit (CPU), an application specific integrated circuit (ASIC), a field-programmable gate array (FPGA), and/or another hardware device. Although a single processor 104 is depicted, it should be understood that the document processor node 102 may include multiple processors, multiple cores, or the like, without departing from the scope of the document processor node 102 system. A distributed file storage 150 may be accessible to processor node 102 and other BC nodes 105. The distributed file storage may be used to store documents identified in ledger (distributed file storage) 150.

The document processor node 102 may also include a non-transitory computer readable medium 112 that may have stored thereon machine-readable instructions executable by the processor 104. Examples of the machine-readable instructions are shown as 114-120 and are further discussed below. Examples of the non-transitory computer readable medium 112 may include an electronic, magnetic, optical, or other physical storage device that contains or stores executable instructions. For example, the non-transitory computer readable medium 112 may be a Random Access memory (RAM), an Electrically Erasable Programmable Read-Only Memory (EEPROM), a hard disk, an optical disc, or other type of storage device.

The processor 104 may execute the machine-readable instructions 114 to receive annotation information. As discussed above, the blockchain ledger 108 may store data to be shared among the nodes 105. The blockchain 106 network may be configured to use one or more smart contracts that manage transactions for multiple participating nodes. Documents linked to the annotation information may be stored in distributed file storage 150. The processor 104 may execute the machine-readable instructions 116 to determine an approval decision based on the annotation information. The processor 104 may execute the machine-readable instructions 118 to record the approval decision information as a new transaction on the blockchain. The processor 104 may execute the machine-readable instructions 120 to determine a consensus of approvals for the annotation information based on approval decisions recorded on the blockchain. The processor 104 may execute the machine-readable instructions 122 to record the consensus as a new transaction on the blockchain.

Figure 2A:
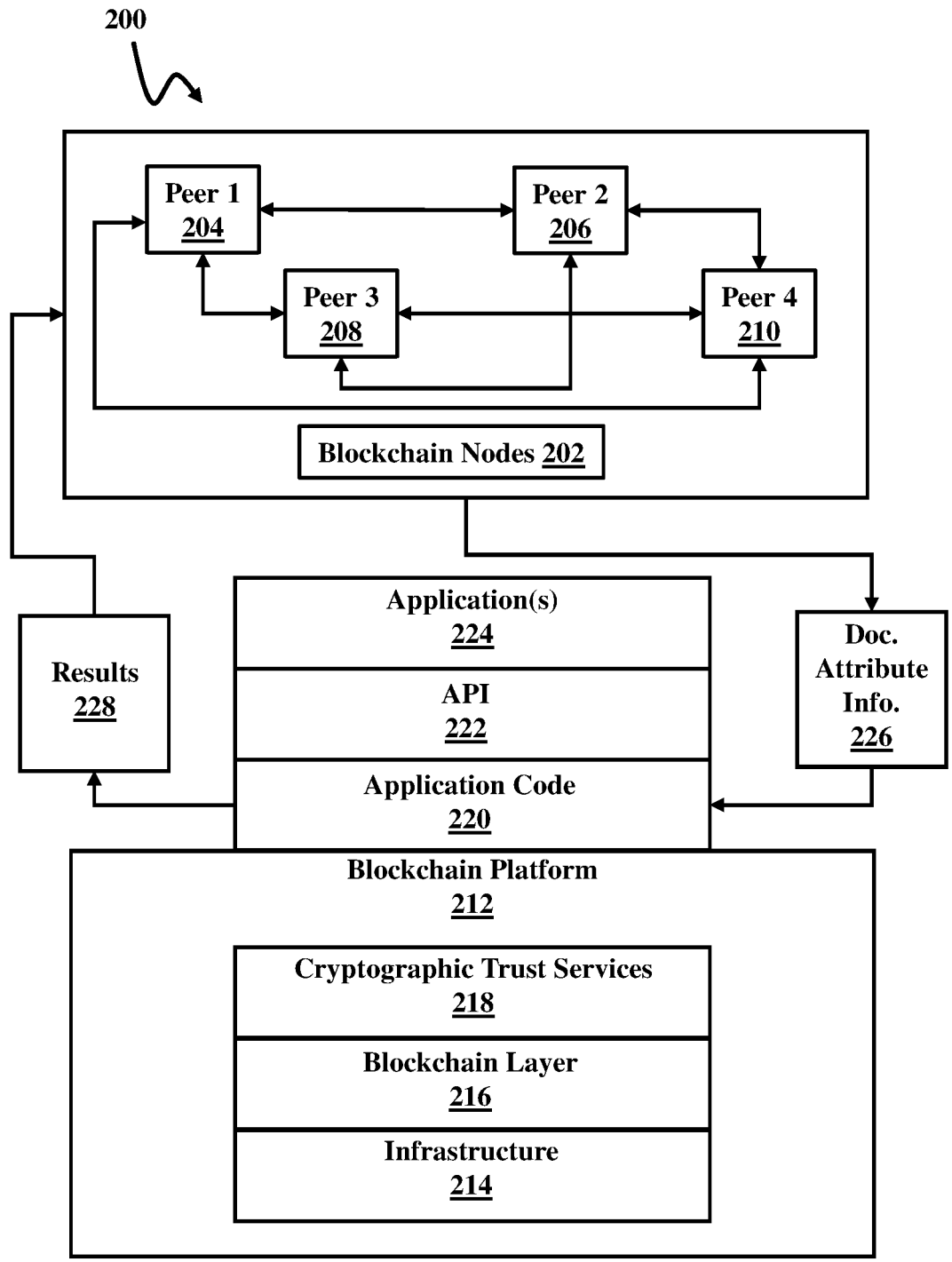
FIG. 2A illustrates an example blockchain architecture configuration, according to example embodiments.

FIG. 2A illustrates a blockchain architecture configuration 200, according to example embodiments. Referring to FIG. 2A, the blockchain architecture 200 may include certain blockchain elements, for example, a group of blockchain nodes 202. The blockchain nodes 202 may include one or more peer nodes 204-210 (these four nodes are depicted by example only). These nodes participate in a number of activities, such as blockchain transaction addition and validation process (consensus). One or more of the blockchain nodes 204-210 may endorse transactions based on endorsement policy and may provide an ordering service for all blockchain nodes in the architecture 200. A blockchain node may initiate a blockchain authentication and seek to write to a blockchain immutable ledger stored in blockchain layer 216, a copy of which may also be stored on the underpinning physical infrastructure 214. The blockchain configuration may include one or more applications 224 which are linked to application programming interfaces (APIs) 222 to access and execute stored program/application code 220 (e.g., chaincode, smart contracts, etc.) which can be created according to a customized configuration sought by participants and can maintain their own state, control their own assets, and receive external information. This can be deployed as a transaction and installed, via appending to the distributed ledger, on all blockchain nodes 204-210.

The blockchain base or platform 212 may include various layers of blockchain data, services (e.g., cryptographic trust services, virtual execution environment, etc.), and underpinning physical computer infrastructure that may be used to receive and store new transactions and provide access to auditors which are seeking to access data entries. The blockchain layer 216 may expose an interface that provides access to the virtual execution environment necessary to process the program code and engage the physical infrastructure 214. Cryptographic trust services 218 may be used to verify transactions such as asset exchange transactions and keep information private.

The blockchain architecture configuration of FIG. 2A may process and execute program/application code 220 via one or more interfaces exposed, and services provided, by blockchain platform 212. The code 220 may control blockchain assets. For example, the code 220 can store and transfer data, and may be executed by nodes 204-210 in the form of a smart contract and associated chaincode with conditions or other code elements subject to its execution. As a non-limiting example, smart contracts may be created to execute reminders, updates, and/or other notifications subject to the changes, updates, etc. The smart contracts can themselves be used to identify rules associated with authorization and access requirements and usage of the ledger. For example, the document attribute(s) information 226 may be processed by one or more processing entities (e.g., virtual machines) included in the blockchain layer 216. The result 228 may include a plurality of linked shared documents. The physical infrastructure 214 may be utilized to retrieve any of the data or information described herein.

A smart contract may be created via a high-level application and programming language, and then written to a block in the blockchain. The smart contract may include executable code which is registered, stored, and/or replicated with a blockchain (e.g., distributed network of blockchain peers). A transaction is an execution of the smart contract code which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A chaincode may include the code interpretation of a smart contract, with additional features. As described herein, the chaincode may be program code deployed on a computing network, where it is executed and validated by chain validators together during a consensus process. The chaincode receives a hash and retrieves from the blockchain a hash associated with the data template created by use of a previously stored feature extractor. If the hashes of the hash identifier and the hash created from the stored identifier template data match, then the chaincode sends an authorization key to the requested service. The chaincode may write to the blockchain data associated with the cryptographic details.

Figure 2B:
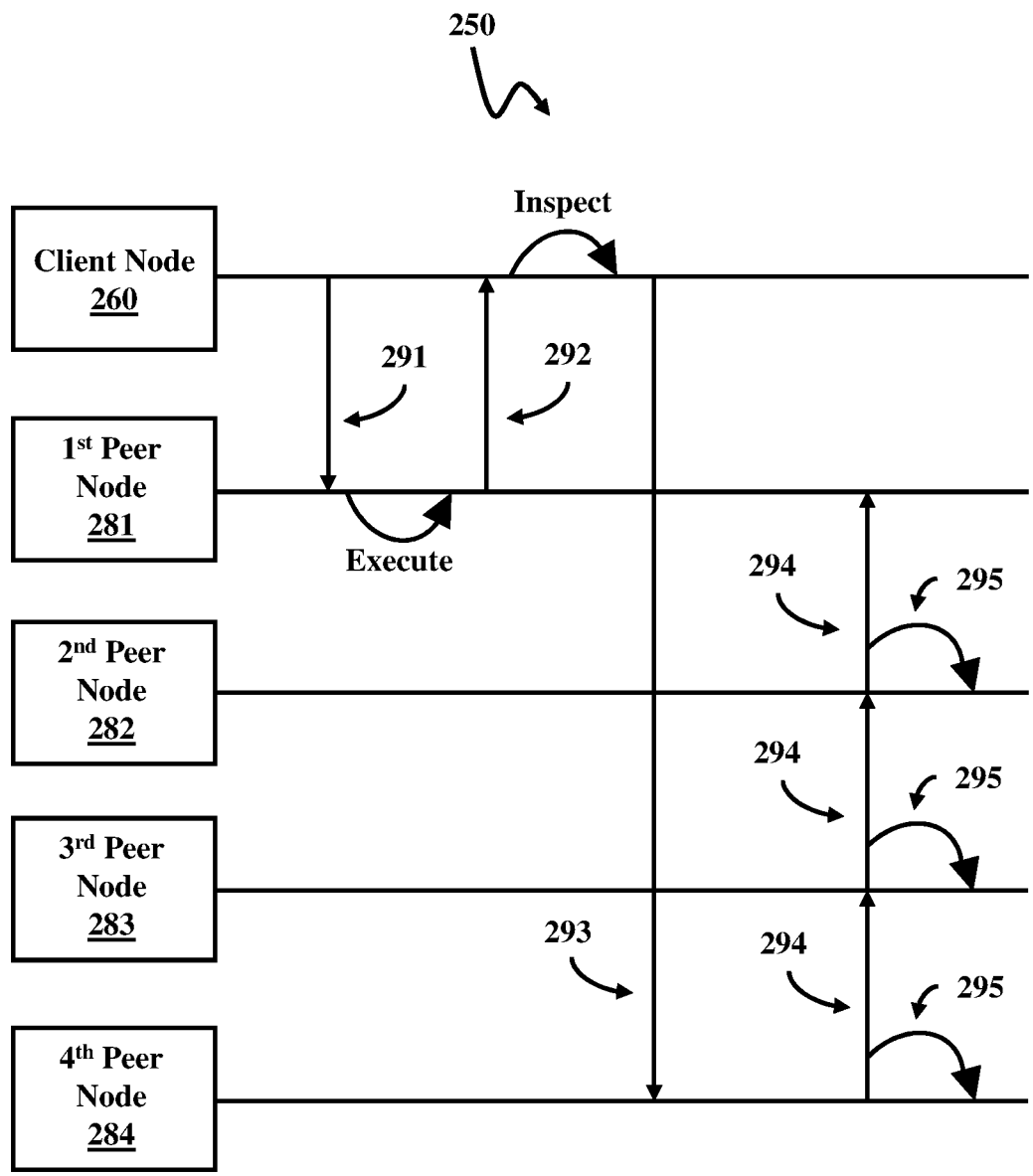
FIG. 2B illustrates a blockchain transactional flow, according to example embodiments.

FIG. 2B illustrates an example of a blockchain transactional flow 250 between nodes of the blockchain in accordance with an example embodiment. Referring to FIG. 2B a general description of transactional flow 250 will be given followed by a more specific example. The transaction flow may include a transaction proposal 291 sent by an application client node 260 to an endorsing peer node 281. The endorsing peer 281 may verify the client signature and execute a chaincode function to initiate the transaction. The output may include the chaincode results, a set of key/value versions that were read in the chaincode (read set), and the set of keys/values that were written in chaincode (write set). The proposal response 292 is sent back to the client 260 along with an endorsement signature, if approved. The client 260 assembles the endorsements into a transaction payload 293 and broadcasts it to an ordering service node 284. The ordering service node 284 then delivers ordered transactions as blocks to all peers 281-283 on a channel. Before committal to the blockchain, each peer 281-283 may validate the transaction. For example, the peers may check the endorsement policy to ensure that the correct allotment of the specified peers have signed the results and authenticated the signatures against the transaction payload 293. In some embodiments, one or more of the peers may be the manager nodes.

A more specific description of transactional flow 250 can be understood with a more specific example. To begin, the client node 260 initiates the transaction 291 by constructing and sending a request to the peer node 281, which is an endorser. The client 260 may include an application leveraging a supported software development kit (SDK), which utilizes an available API to generate a transaction proposal. The proposal is a request to invoke a chaincode function so that data can be read and/or written to the ledger (i.e., write new key value pairs for the assets). The SDK may serve as a shim to package the transaction proposal into a properly architected format (e.g., protocol buffer over a remote procedure call (RPC)) and take the client's cryptographic credentials to produce a unique signature for the transaction proposal.

In response, the endorsing peer node 281 may verify (a) that the transaction proposal is well formed, (b) the transaction has not been submitted already in the past (replay-attack protection), (c) the signature is valid, and (d) that the submitter (client 260, in the example) is properly authorized to perform the proposed operation on that channel. The endorsing peer node 281 may take the transaction proposal inputs as arguments to the invoked chaincode function. The chaincode is then executed against a current state database to produce transaction results including a response value, read set, and write set. However, no updates are made to the ledger at this point. In 292, the set of values, along with the endorsing peer node's 281 signature is passed back as a proposal response 292 to the SDK of the client 260 which parses the payload for the application to consume.

In response, the application of the client 260 inspects/verifies the endorsing peers signatures and compares the proposal responses to determine if the proposal response is the same. If the chaincode only queried the ledger, the application would inspect the query response and would typically not submit the transaction to the ordering service node 284. If the client application intends to submit the transaction to the ordering node service 284 to update the ledger, the application determines if the specified endorsement policy has been fulfilled before submitting (i.e., did all peer nodes necessary for the transaction endorse the transaction). Here, the client may include only one of multiple parties to the transaction. In this case, each client may have their own endorsing node, and each endorsing node may need to endorse the transaction. The architecture is such that even if an application selects not to inspect responses or otherwise forwards an unendorsed transaction, the endorsement policy may still be enforced by peers and upheld at the commit validation phase.

After successful inspection, the client 260 assembles endorsements into a transaction 293 and broadcasts the transaction proposal and response within a transaction message to the ordering node 284. The transaction may contain the read/write sets, the endorsing peers signatures and a channel ID. The ordering node 284 does not need to inspect the entire content of a transaction in order to perform its operation. Instead, the ordering node 284 may simply receive transactions from all channels in the network, order them chronologically by channel, and create blocks of transactions per channel.

The blocks of the transaction are delivered from the ordering node 284 to all peer nodes 281-283 on the channel. The transactions 294 within the block are validated to ensure any endorsement policy is fulfilled and to ensure that there have been no changes to ledger state for read set variables since the read set was generated by the transaction execution. Transactions in the block are tagged as being valid or invalid. Furthermore, in step 295 each peer node 281-283 appends the block to the channel's chain, and for each valid transaction the write sets are committed to current state database. An event is emitted to notify the client application that the transaction (invocation) has been immutably appended to the chain, as well as to notify whether the transaction was validated or invalidated.

Figure 3A:
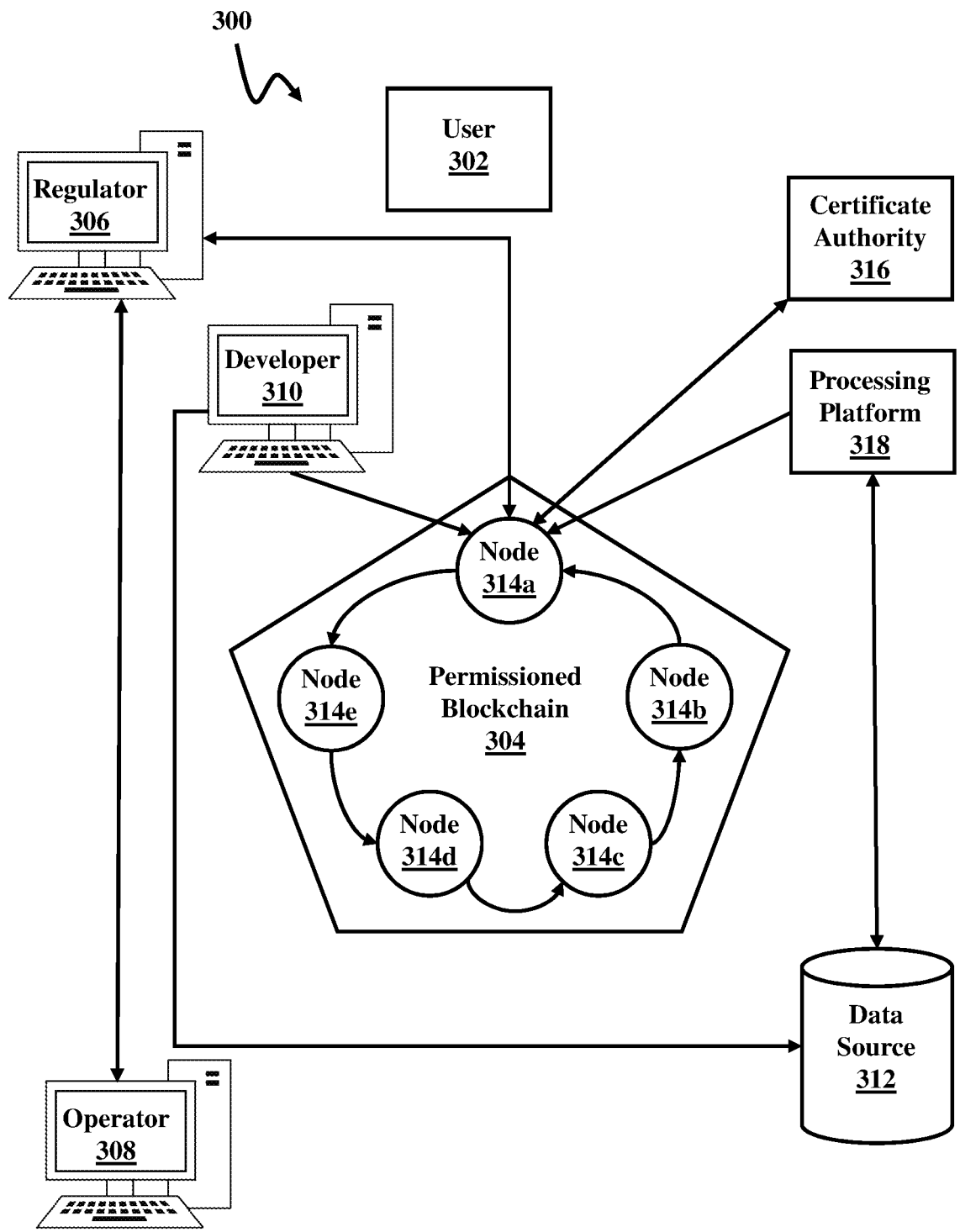
FIG. 3A illustrates a permissioned network, according to example embodiments.

FIG. 3A illustrates an example of a permissioned blockchain network 300, which features a distributed, decentralized peer-to-peer architecture. In this example, a blockchain user 302 may initiate a transaction to the permissioned blockchain 304. In this example, the transaction can be a deploy, invoke, or query, and may be issued through a client-side application leveraging an SDK, directly through an API, etc. Networks may provide access to a regulator 306, such as an auditor. A blockchain network operator 308 manages member permissions, such as enrolling the regulator 306 as an "auditor" and the blockchain user 302 as a "client." An auditor may be restricted only to querying the ledger whereas a client may be authorized to deploy, invoke, and query certain types of chaincode.

A blockchain developer 310 can write chaincode and client-side applications. The blockchain developer 310 can deploy chaincode directly to the network through an interface. To include credentials from a traditional data source 312 in chaincode, the developer 310 may use an out-of-band connection to access the data. In this example, the blockchain user 302 connects to the permissioned blockchain 304 through one of peer nodes 314 (referring to any one of nodes 314a-e). Before proceeding with any transactions, the peer node 314 (e.g., node 314a) retrieves the user's enrollment and transaction certificates from a certificate authority 316, which manages user roles and permissions. In some cases, blockchain users must possess these digital certificates in order to transact on the permissioned blockchain 304. Meanwhile, a user attempting to utilize chaincode may be required to verify their credentials on the traditional data source 312. To confirm the user's authorization, chaincode can use an out-of-band connection to this data through a traditional processing platform 318.

Figure 3B:
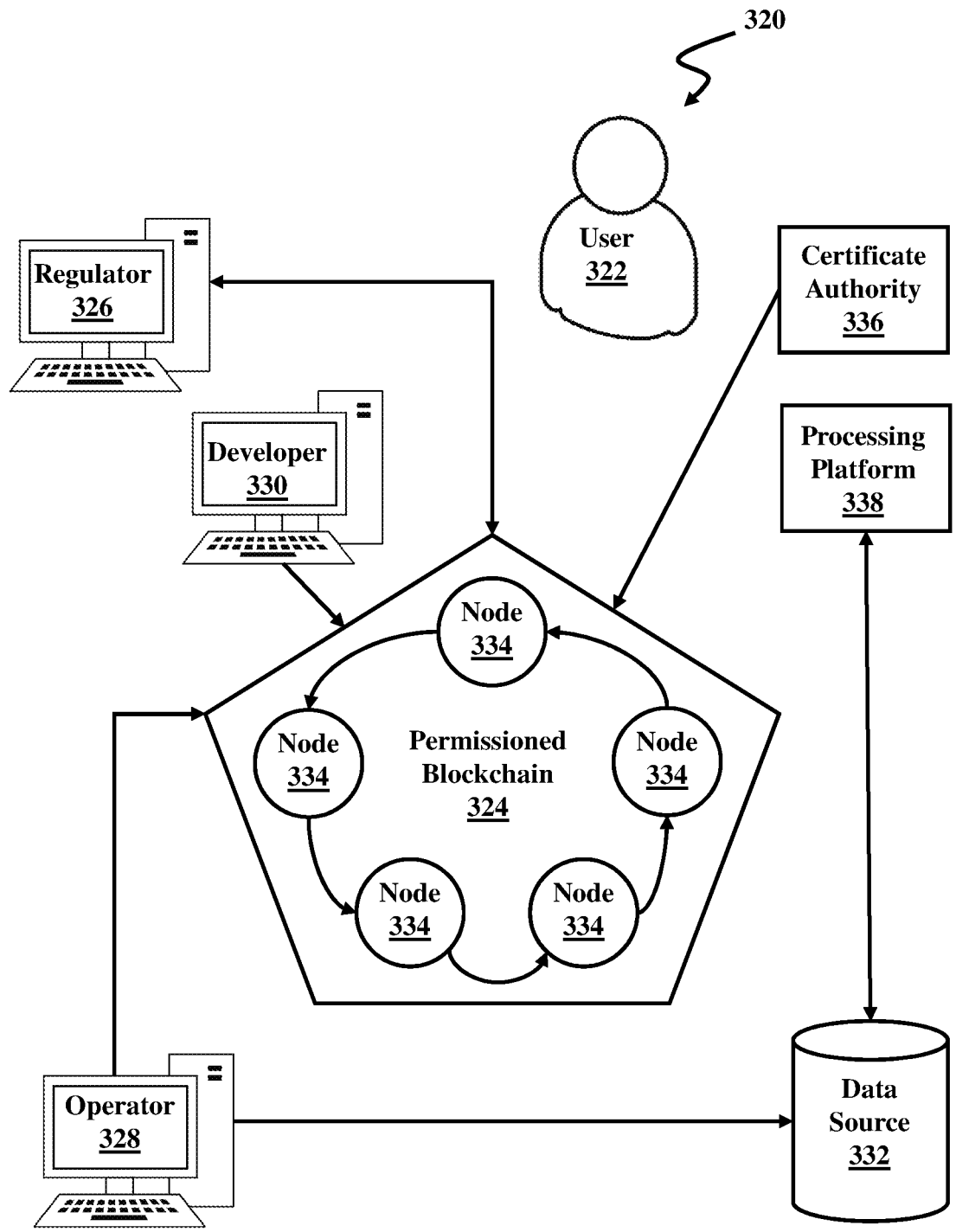
FIG. 3B illustrates another permissioned network, according to example embodiments.

FIG. 3B illustrates another example of a permissioned blockchain network 320, which features a distributed, decentralized peer-to-peer architecture. In this example, a blockchain user 322 may submit a transaction to the permissioned blockchain 324. In this example, the transaction can be a deploy, invoke, or query, and may be issued through a client-side application leveraging an SDK, directly through an API, etc. Networks may provide access to a regulator 326, such as an auditor. A blockchain network operator 328 manages member permissions, such as enrolling the regulator 326 as an "auditor" and the blockchain user 322 as a "client." An auditor may be restricted to only querying the ledger whereas a client may be authorized to deploy, invoke, and query certain types of chaincode.

A blockchain developer 330 writes chaincode and client-side applications. The blockchain developer 330 can deploy chaincode directly to the network through an interface. To include credentials from a traditional data source 332 in chaincode, the developer 330 may use an out-of-band connection to access the data. In this example, the blockchain user 322 connects to the network through a peer node 334. Before proceeding with any transactions, the peer node 334 retrieves the user's enrollment and transaction certificates from the certificate authority 336. In some cases, blockchain users must possess these digital certificates in order to transact on the permissioned blockchain 324. Meanwhile, a user attempting to utilize chaincode may be required to verify their credentials on the traditional data source 332. To confirm the user's authorization, chaincode can use an out-of-band connection to this data through a traditional processing platform 338.

In some embodiments of the present disclosure, the blockchain herein may be a permissionless blockchain. In contrast with permissioned blockchains which require permission to join, anyone can join a permissionless blockchain. For example, to join a permissionless blockchain a user may create a personal address and begin interacting with the network, by submitting transactions, and hence adding entries to the ledger. Additionally, all parties have the choice of running a node on the system and employing the mining protocols to help verify transactions.

Figure 3C:
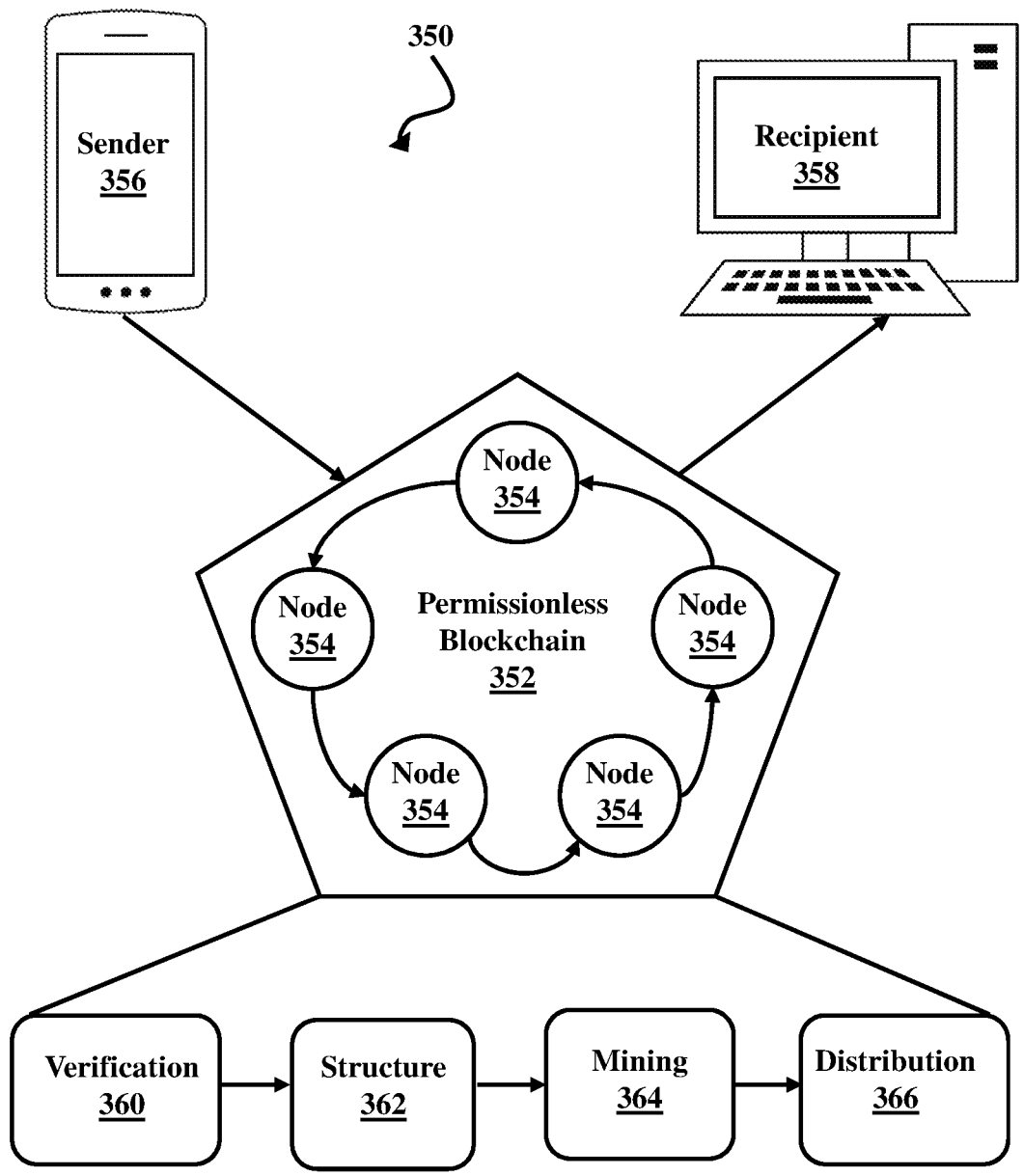
FIG. 3C illustrates a permissionless network, according to example embodiments.

FIG. 3C illustrates a process 350 of a transaction being processed by a permissionless blockchain 352 including a plurality of nodes 354. A sender 356 desires to send payment or some other form of value (e.g., a deed, medical records, a contract, a good, a service, or any other asset that can be encapsulated in a digital record) to a recipient 358 via the permissionless blockchain 352. In some embodiments, each of the sender device 356 and the recipient device 358 may have digital wallets (associated with the blockchain 352) that provide user interface controls and a display of transaction parameters. In response, the transaction is broadcast throughout the blockchain 352 to the nodes 354.

Depending on the blockchain's 352 network parameters the nodes verify 360 the transaction based on rules (which may be pre-defined or dynamically allocated) established by the permissionless blockchain 352 creators. For example, this may include verifying identities of the parties involved, etc. The transaction may be verified immediately or it may be placed in a queue with other transactions and the nodes 354 determine if the transactions are valid based on a set of network rules.

In structure 362, valid transactions are formed into a block and sealed with a lock (hash). This process may be performed by mining nodes among the nodes 354. Mining nodes may utilize additional software specifically for mining and creating blocks for the permissionless blockchain 352. Each block may be identified by a hash (e.g., 256 bit number, etc.) created using an algorithm agreed upon by the network. Each block may include a header, a pointer or reference to a hash of a previous block's header in the chain, and a group of valid transactions. The reference to the previous block's hash is associated with the creation of the secure independent chain of blocks.

Before blocks can be added to the blockchain, the blocks must be validated. Validation for the permissionless blockchain 352 may include a proof-of-work (PoW) which is a solution to a puzzle derived from the block's header. Although not shown in the example of FIG. 3C, another process for validating a block is proof-of-stake. Unlike the proof-of-work, where the algorithm rewards miners who solve mathematical problems, with the proof of stake, a creator of a new block is chosen in a deterministic way, depending on its wealth, also defined as "stake." Then, a similar proof is performed by the selected/chosen node.

With mining 364, nodes try to solve the block by making incremental changes to one variable until the solution satisfies a network-wide target. This creates the PoW thereby ensuring correct answers. In other words, a potential solution must prove that computing resources were drained in solving the problem. In some types of permissionless blockchains, miners may be rewarded with value (e.g., coins, etc.) for correctly mining a block.

Here, the PoW process, alongside the chaining of blocks, makes modifications of the blockchain extremely difficult, as an attacker must modify all subsequent blocks in order for the modifications of one block to be accepted. Furthermore, as new blocks are mined, the difficulty of modifying a block increases, and the number of subsequent blocks increases. With distribution 366, the successfully validated block is distributed through the permissionless blockchain 352 and all nodes 354 add the block to a majority chain which is the permissionless blockchain's 352 auditable ledger. Furthermore, the value in the transaction submitted by the sender 356 is deposited or otherwise transferred to the digital wallet of the recipient device 358.

Figure 4A:
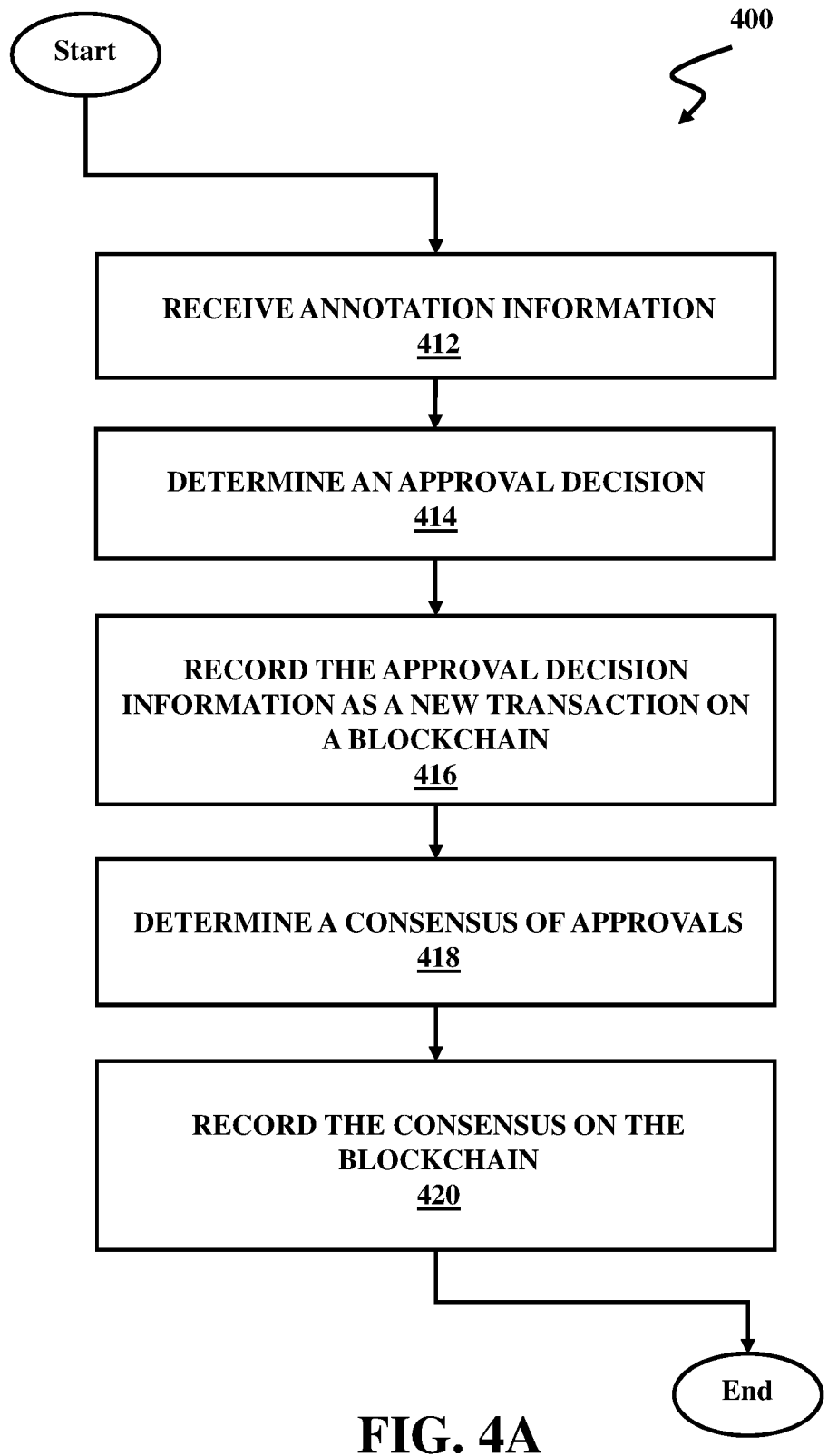
FIG. 4A illustrates a flow diagram of smart data annotation using a blockchain network, according to example embodiments.

FIG. 4A illustrates a flow diagram of an example method 400 of smart data annotation in blockchain networks, according to example embodiments. Referring to FIG. 4A, the method 400 may include one or more of the steps described below.

FIG. 4A illustrates a flow chart of an example method 400 of making and recording an approval decision and determining and recording a consensus that may be executed by a document processor node, such as a manager node, herein referred to as a manager processor. It should be understood that method 400 depicted in FIG. 4A may include additional operations and that some of the operations described therein may be removed and/or modified without departing from the scope of the method 400.

With reference to FIG. 4A, at block 412, a manager processor (such as processor 104 of FIG. 1A) may receive annotation information. In some embodiments, a document associated with the annotation information may be received by a manager processor (for example, a processor in a management node) and stored in a distributed file storage, such as distributed file storage 150. In some embodiments, the annotation information may be recorded as a new transaction on a blockchain. In some embodiments the annotation information includes a document with one or more words annotated (e.g., tagging a word, term or datapoint with a meaning or association for the word term or datapoint) by an annotator. For example, a manager node (e.g., the manager processor) may receive an annotation where the abbreviation "LAC" is tagged with the meaning of "laceration," and in block 414 the manager node may either approve or not approve that "LAC" is intended to refer to "laceration."

In some embodiments, at block 414, the manager processor may determine an approval decision based on the annotation information. In some embodiments, other manager processors may determine other approval decisions based on the annotation information. In some embodiments, the manager processor may be trained by a user to provide approval decisions. In some embodiments, the training involves creating a cognitive system trained with machine learning and sets of data. In some embodiments, the training involves feeding a set of preapproved annotations (e.g., documents containing annotations) into a machine and the determining involves comparing the received annotation information to the set of preapproved annotations. In some embodiments, the determination is made by a user and provided to manager processor. For example, the manager processor may approve the annotation tagging "LAC" as meaning "laceration." In some embodiments, the processor may be trained, by a technical expert, to provide an approval decision.

At block 416, the manager processor may record the approval decision information as a new transaction on the blockchain. In other words, the manager processor may record the approval of the abbreviation "LAC" as referring to "laceration" for manager node from which the approval was received in block 412. In some embodiments, other manager processors (not depicted) in BC nodes 105 may record other approval decisions as new transactions on the blockchain.

At block 418, the manager processor may determine a consensus of approvals for the annotation information based on approval decisions recorded on the blockchain. In some embodiments, the consensus is a determination that a certain percentage (e.g., 51% of managers that submitted an approval decision, or 51% of the total managers that had the authority to submit an approval decisions) of managers approved. In some embodiments, the consensus may be recorded as the number of managers that have approved and the number that have not approved an annotation. For example, where 88 manager processors out of 100 manager processors may approve an annotation, with 10 annotators disapproving the annotation, and 2 manager processor not recording an approval decision the decision could be recorded as annotation x (x standing for an annotation identifier) is approved or it may be recorded as 88 managers approve annotation x, 10 annotators disapprove, 2 managers did not record. Other consensus schemes are possible. Continuing the example above, while the manager processor performing method 400 may have approved that the annotation tagging "LAC" with a meaning of "laceration," 88% of all manager nodes may have disapproved. In this example, the manager processor may determine that the consensus is disapproval of the annotation tagging "LAC" with a meaning of "laceration."

In some embodiments, the consensus may be determined using a consensus algorithm. Consensus algorithm may refer to one of several protocols for solving the consensus problem in the field of computer science which is used to achieve agreement on a single data value among distributed processes or systems or the current state of a distributed system. Consensus algorithms may, in some cases, be primarily used to achieve reliability in a network involving multiple distributed nodes that contain the same information. In some instances, consensus algorithms assume that some processes and systems may be unavailable and that some communications may be lost. As a result, consensus algorithms must be fault-tolerant. They typically assume, for example, that only a portion of nodes may respond but require a response from a set quantity, such as 51%, at a minimum. Some types of consensus algorithms that may be used include Proof-of-Work (PoW), Proof-of-Stake (PoS), Delegated Proof-of-Stake (DPoS), Byzantine Fault Tolerance (BFT), Practical Byzantine Fault Tolerance (PBFT), and Proof-of-Weight (PoW). Examples used herein are merely for explanation purposes and should not be construed as how an actual consensus would be determined.

Explaining exemplary consensus algorithms further, the manager nodes are the parties participating in the distributed network running the blockchain (database) in question. The messages they are sending back and forth are the means of communication across the network on which the blockchain is running. The collective goal of the is to decide whether or not to accept an annotation submitted to the blockchain (database) as valid or not (approved or not approved). It is assumed that some blockchain participants, who are interested in ensuring the integrity of the blockchain (database) and therefore ensuring that only correct information is accepted. On the other hand, it is also assumed some nodes may not be providing accurate information, these nodes may be any party seeking to falsify information or unintentionally provide unreliable information to the blockchain (the database). The examples of a consensus give, such as "annotation x is approved or it may be recorded as 88 managers approve 10 annotators disapprove 2 managers did not record," are not intended to demonstrate how a consensus algorithm may be formed or what form the consensus may take, but are instead used as a simple example for the overall understanding of the method.

At block 420, the manager processor may record the consensus as a new transaction on the blockchain.

Figure 4B:
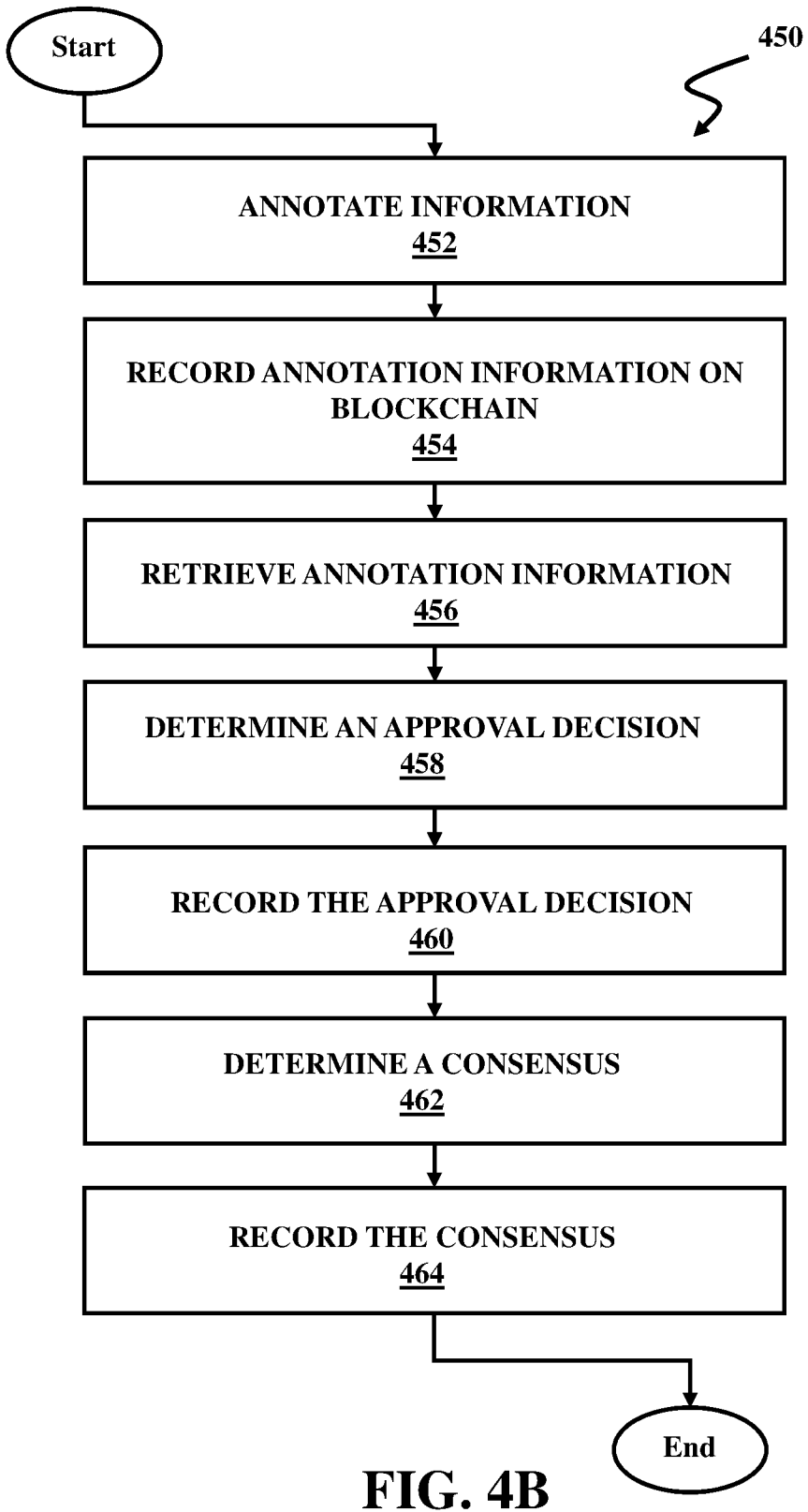
FIG. 4B illustrates a further flow diagram of the process of determining a data annotation consensus of using a blockchain network, according to example embodiments.

FIG. 4B illustrates a flow diagram of an example method 450 depicting how a consensus of manager node's approval decisions may be determined for an annotation created by an annotation node, according to example embodiments. Referring to FIG. 4B, the method 450 may include one or more of the following steps.

At block 452, the an annotation processor may annotate (e.g., tagging a word, term or datapoint with a meaning or association for the word term or datapoint) information. In some embodiments, the annotation processor may have been trained by a user (e.g., a technical expert) to provide annotations. For example, an annotator may annotate "LAC" by tagging it with the meaning "laceration" in a first document.

At block 454, the annotation processor (e.g., utilizing the annotator) may record annotation information on a blockchain. For example, the annotation information may include a location for the first document in a distributed file storage, a document identifier (ID), a document digest, and at least one document annotation (e.g., a token/span identifier for the annotation and a tag labeling the abbreviation "LAC" as meaning "laceration").

At block 456, a manager processor (e.g., a manager node or utilizing a manager node) may retrieve the annotation information from the blockchain so the manager can determine an approval decision in block 458. For example, a processor may retrieve the location for the first document in the distributed file storage, the document identifier (ID), the document digest, and the at least one document annotation. In some embodiments, the manager processor may be the same processor as the annotation processor. In some embodiments, the manager processor may be a different processor from the annotation processor.

At block 458, the manager processor may determine an approval decision based on the annotation information. In some embodiments, the approval decisions is based on the criteria explained in block 414. For example, the manager processor may approve the annotation.

At block 460, the manager processor may record the approval decision on the blockchain.

At block 462, the manager processor may run a consensus algorithm to determine a consensus of the manager nodes The determination of the consensus may be based on the criteria explained in 418 above.

At block 464, the manager processor may record the consensus on the blockchain.

In some embodiments, method 450 and 400, or parts therein may be repeated as new manager nodes add approval decisions to the block chain ledger. For instance, a managing processor retrieves a second set of approval decisions (e.g., new approval decisions made after the first consensus was formed related to the same annotation as the first consensus) from the blockchain. Next, the managing processor generates an updated consensus based on the first set of approval decisions and the second set of approval decisions. Finally, the managing processor records the updated consensus in the blockchain. For example, if the first set of approval decisions are based on 2 nodes disapproving and 0 nodes approving an annotation, a first consensus may be "not-approved." Later, if after the first consensus is recorded, 100 nodes approve the annotation, and no new notes disapprove, a second consensus may be "approved" based on the 100 nodes approving and 2 nodes disapproving.

Figure 5A:
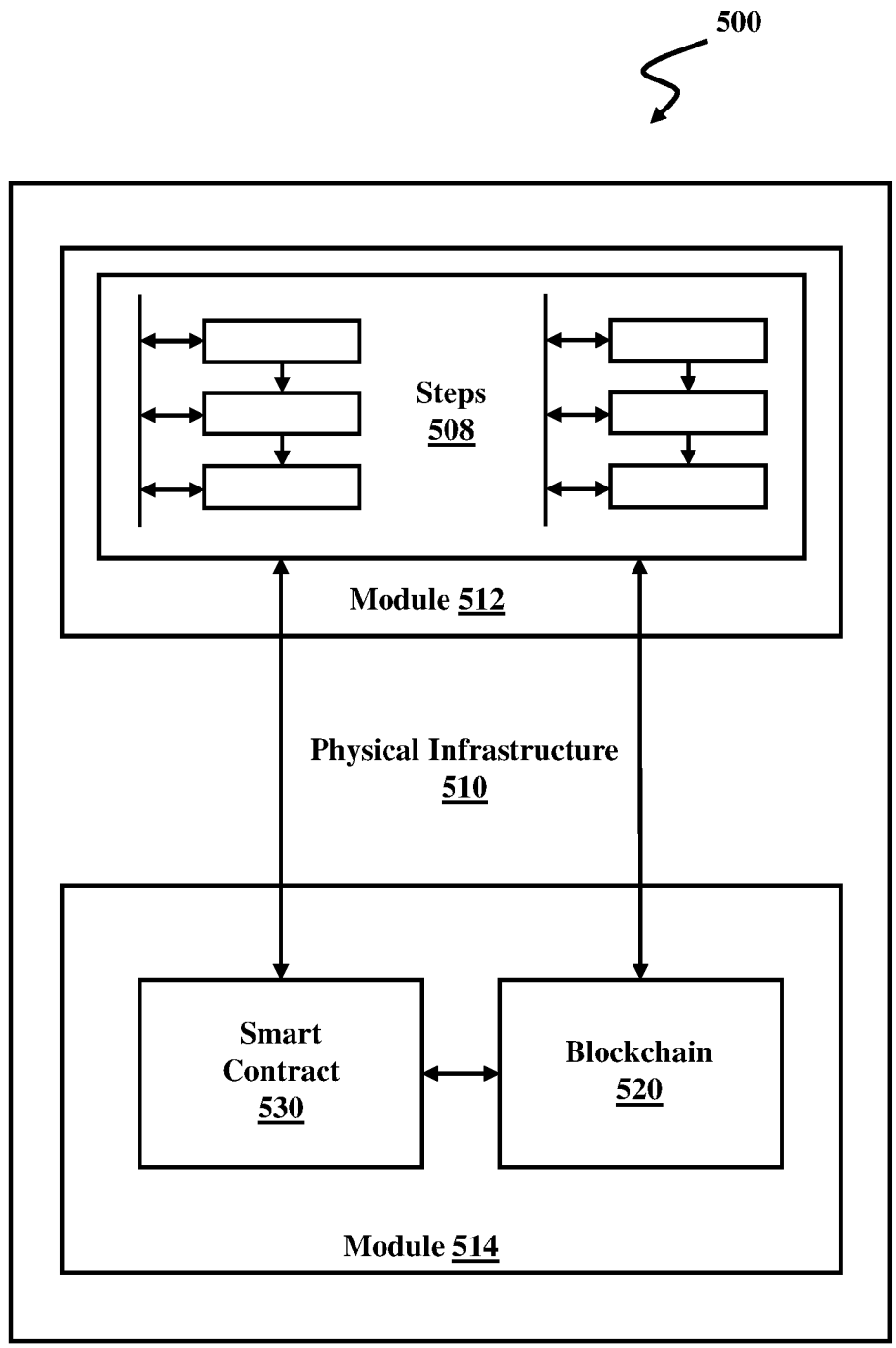
FIG. 5A illustrates an example system configured to perform one or more operations described herein, according to example embodiments.

FIG. 5A illustrates an example system 500 that includes a physical infrastructure 510 configured to perform various operations according to example embodiments. Referring to FIG. 5A, the physical infrastructure 510 includes a module 512 and a module 514. The module 514 includes a blockchain 520 and a smart contract 530 (which may reside on the blockchain 520), that may execute any of the operational steps 508 (in module 512) included in any of the example embodiments. The steps/operations 508 may include one or more of the embodiments described or depicted and may represent output or written information that is written or read from one or more smart contracts 530 and/or blockchains 520. The physical infrastructure 510, the module 512, and the module 514 may include one or more computers, servers, processors, memories, and/or wireless communication devices. Further, the module 512 and the module 514 may be a same module.

Figure 5B:
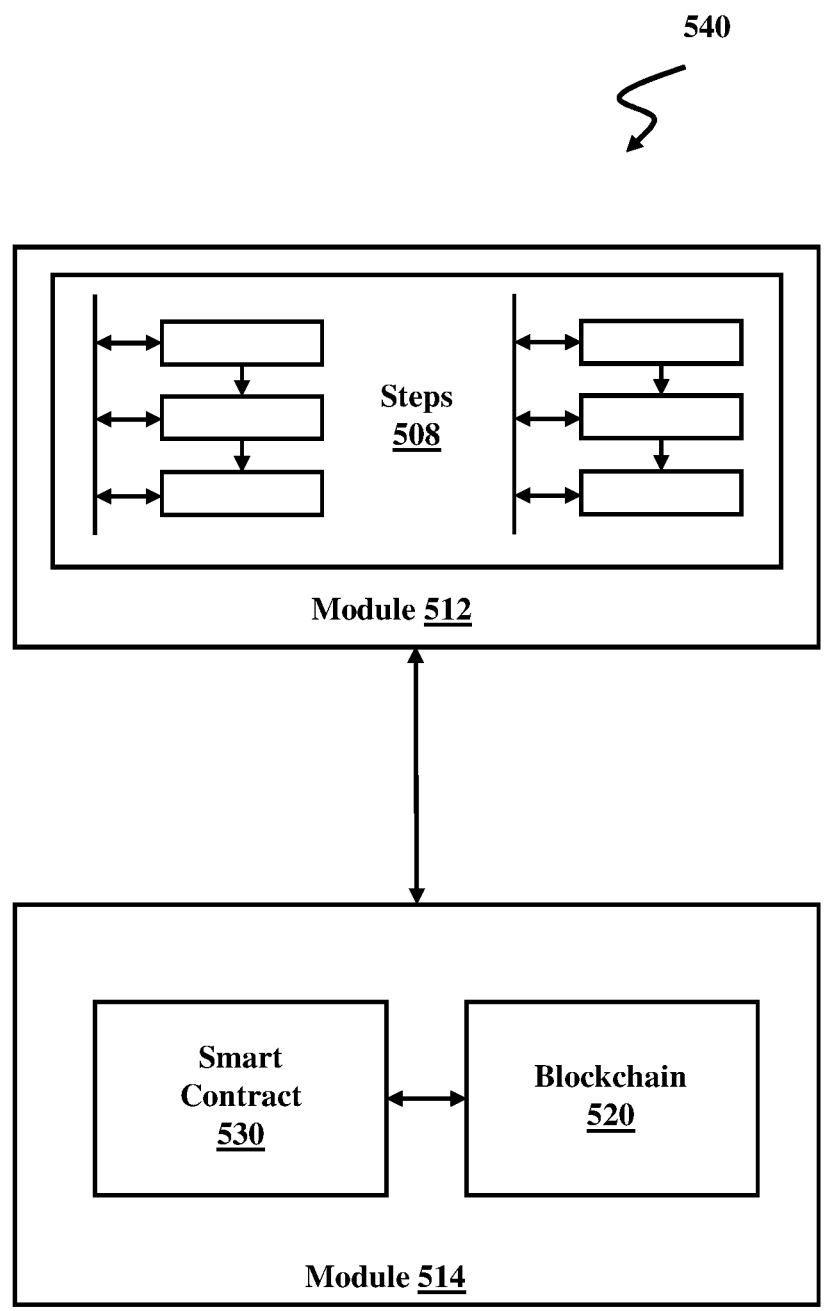
FIG. 5B illustrates another example system configured to perform one or more operations described herein, according to example embodiments.

FIG. 5B illustrates another example system 540 configured to perform various operations according to example embodiments. Referring to FIG. 5B, the system 540 includes a module 512 and a module 514. The module 514 includes a blockchain 520 and a smart contract 530 (which may reside on the blockchain 520), that may execute any of the operational steps 508 (in module 512) included in any of the example embodiments. The steps/operations 508 may include one or more of the embodiments described or depicted and may represent output or written information that is written or read from one or more smart contracts 530 and/or blockchains 520. The physical module 512 and the module 514 may include one or more computers, servers, processors, memories, and/or wireless communication devices. Further, the module 512 and the module 514 may be a same module.

Figure 5C:
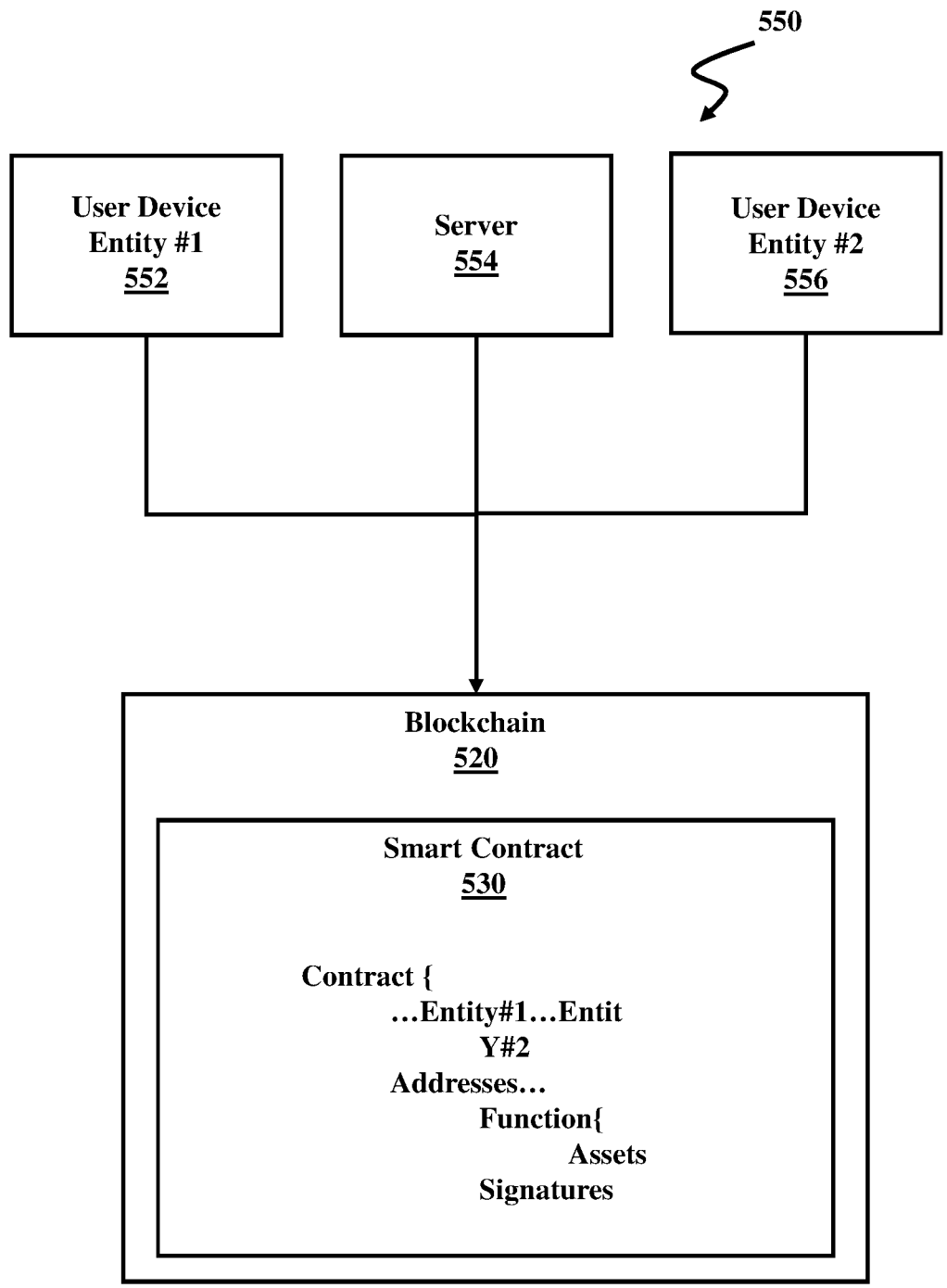
FIG. 5C illustrates a further example system configured to utilize a smart contract, according to example embodiments.

FIG. 5C illustrates an example system configured to utilize a smart contract configuration among contracting parties and a mediating server configured to enforce the smart contract terms on the blockchain according to example embodiments. Referring to FIG. 5C, the configuration 550 may represent a communication session, an asset transfer session or a process or procedure that is driven by a smart contract 530 which explicitly identifies one or more user devices 552 and/or 556. The execution, operations and results of the smart contract execution may be managed by a server 554. Content of the smart contract 530 may require digital signatures by one or more of the entities 552 and 556 which are parties to the smart contract transaction. The results of the smart contract execution may be written to a blockchain 520 as a blockchain transaction. The smart contract 530 resides on the blockchain 520 which may reside on one or more computers, servers, processors, memories, and/or wireless communication devices.

Figure 5D:
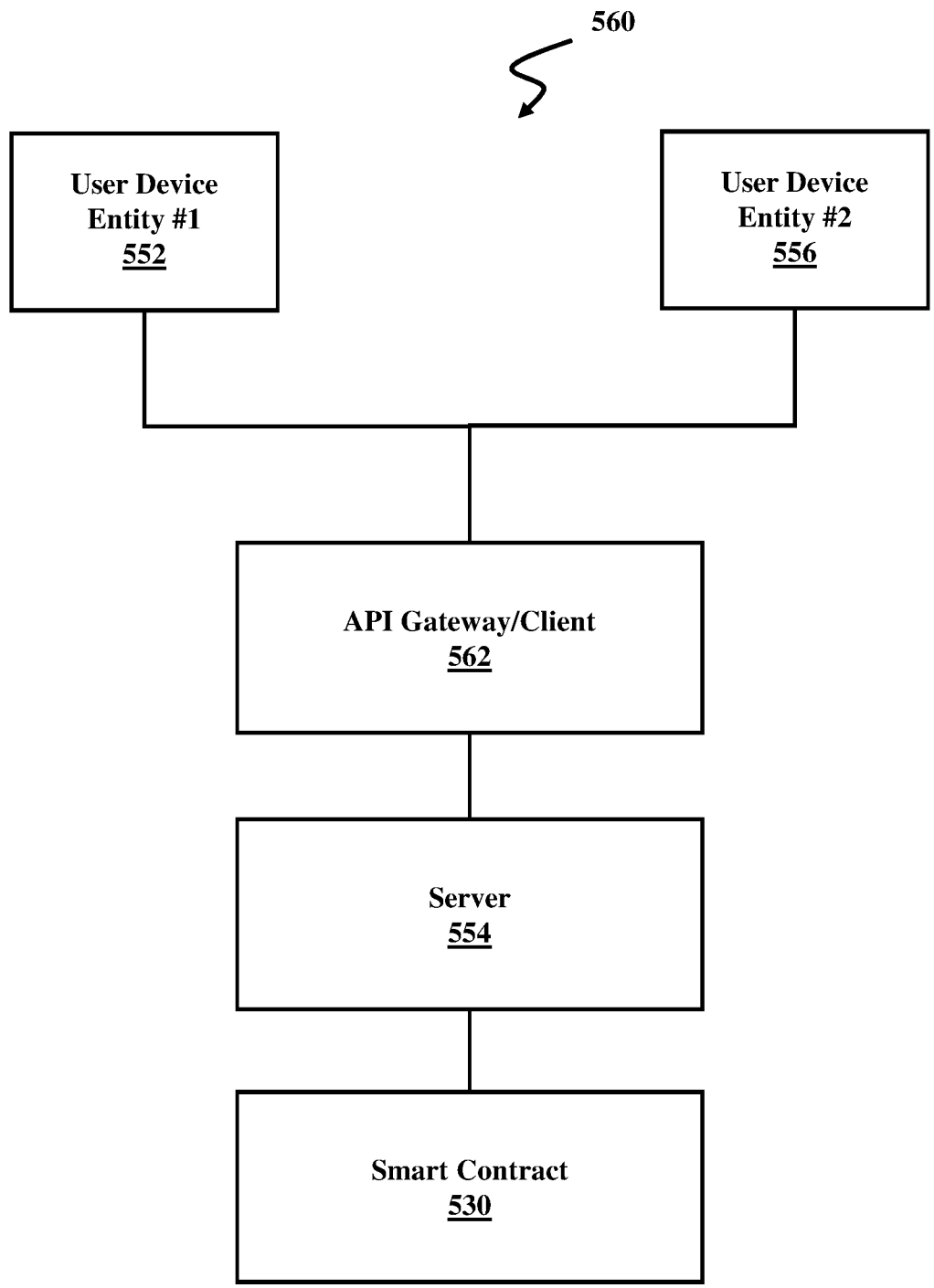
FIG. 5D illustrates another example system configured to utilize a blockchain, according to example embodiments.

FIG. 5D illustrates a system 560 including a blockchain, according to example embodiments. Referring to the example of FIG. 5D, an application programming interface (API) gateway 562 provides a common interface for accessing blockchain logic (e.g., smart contract 530 or other chaincode) and data (e.g., distributed ledger, etc.). In this example, the API gateway 562 is a common interface for performing transactions (invoke, queries, etc.) on the blockchain by connecting one or more entities 552 and 556 to a blockchain peer (i.e., server 554). Here, the server 554 is a blockchain network peer component that holds a copy of the world state and a distributed ledger allowing clients 552 and 556 to query data on the world state as well as submit transactions into the blockchain network where, depending on the smart contract 530 and endorsement policy, endorsing peers may run the smart contracts 530.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components.

Figure 6A:
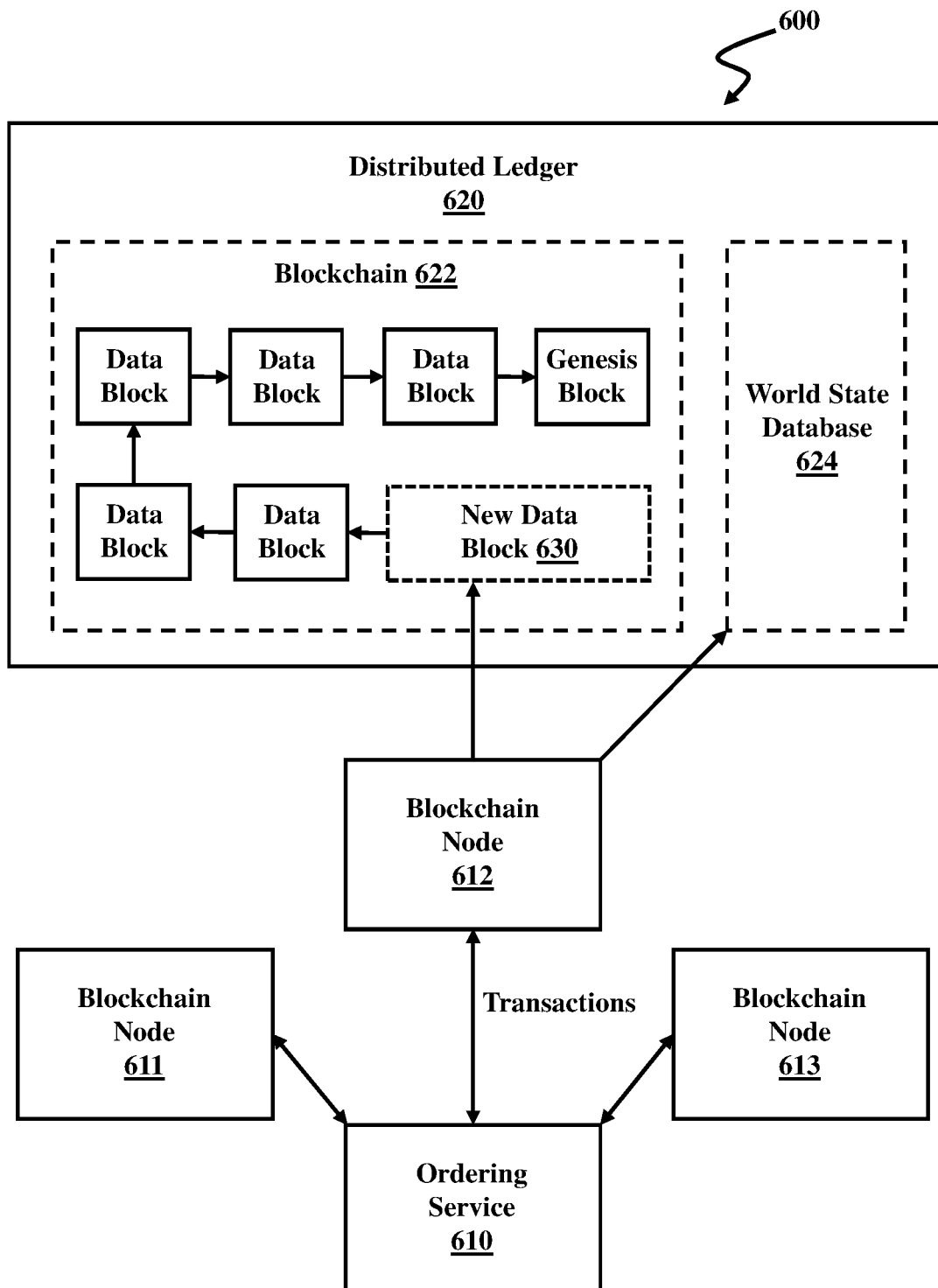
FIG. 6A illustrates a process for a new block being added to a distributed ledger, according to example embodiments.
Figure 6B:
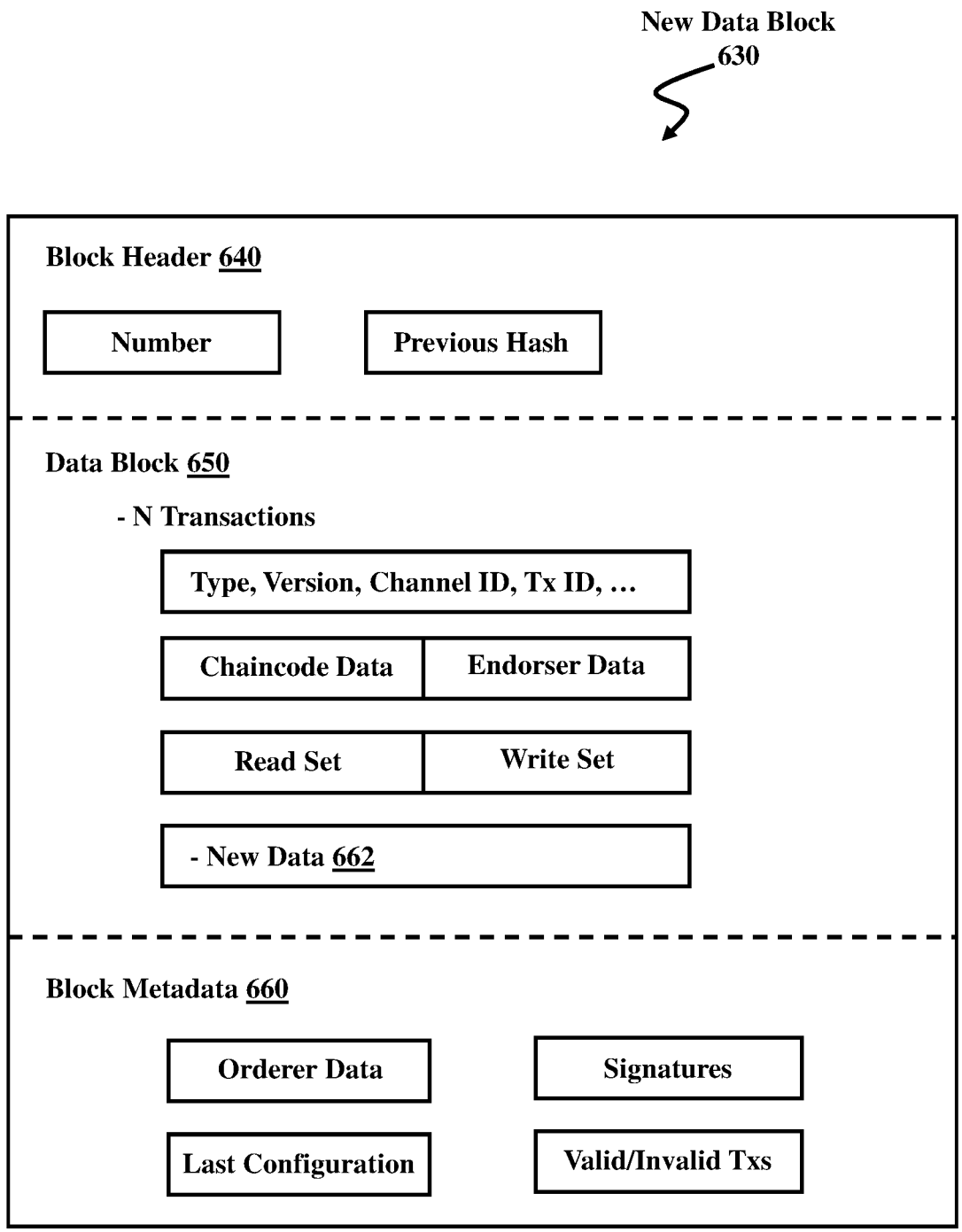
FIG. 6B illustrates contents of a new data block, according to example embodiments.

FIG. 6A illustrates a process 600 of a new block being added to a distributed ledger 620, according to example embodiments, and FIG. 6B illustrates contents of a new data block structure 630 for blockchain, according to example embodiments. The new data block 630 may contain document linking data.

Referring to FIG. 6A, clients (not shown) may submit transactions to blockchain nodes 611, 612, and/or 613. Clients may be instructions received from any source to enact activity on the blockchain 620. As an example, clients may be applications that act on behalf of a requester, such as a device, person or entity to propose transactions for the blockchain. The plurality of blockchain peers (e.g., blockchain nodes 611, 612, and 613) may maintain a state of the blockchain network and a copy of the distributed ledger 620.

Different types of blockchain nodes/peers may be present in the blockchain network including endorsing peers which simulate and endorse transactions proposed by clients and committing peers which verify endorsements, validate transactions, and commit transactions to the distributed ledger 620. In this example, the blockchain nodes 611, 612, and 613 may perform the role of endorser node, committer node, or both.

The distributed ledger 620 includes a blockchain which stores immutable, sequenced records in blocks, and a state database 624 (current world state) maintaining a current state of the blockchain 622. One distributed ledger 620 may exist per channel and each peer maintains its own copy of the distributed ledger 620 for each channel of which they are a member. The blockchain 622 is a transaction log, structured as hash-linked blocks where each block contains a sequence of N transactions. Blocks may include various components such as shown in FIG. 6B. The linking of the blocks (shown by arrows in FIG. 6A) may be generated by adding a hash of a prior block's header within a block header of a current block. In this way, all transactions on the blockchain 622 are sequenced and cryptographically linked together preventing tampering with blockchain data without breaking the hash links. Furthermore, because of the links, the latest block in the blockchain 622 represents every transaction that has come before it. The blockchain 622 may be stored on a peer file system (local or attached storage), which supports an append-only blockchain workload.

The current state of the blockchain 622 and the distributed ledger 622 may be stored in the state database 624. Here, the current state data represents the latest values for all keys ever included in the chain transaction log of the blockchain 622. Chaincode invocations execute transactions against the current state in the state database 624. To make these chaincode interactions extremely efficient, the latest values of all keys are stored in the state database 624. The state database 624 may include an indexed view into the transaction log of the blockchain 622, it can therefore be regenerated from the chain at any time. The state database 624 may automatically get recovered (or generated if needed) upon peer startup, before transactions are accepted.

Endorsing nodes receive transactions from clients and endorse the transaction based on simulated results. Endorsing nodes hold smart contracts which simulate the transaction proposals. When an endorsing node endorses a transaction, the endorsing node creates a transaction endorsement which is a signed response from the endorsing node to the client application indicating the endorsement of the simulated transaction. The method of endorsing a transaction depends on an endorsement policy which may be specified within chaincode. An example of an endorsement policy is "the majority of endorsing peers must endorse the transaction." Different channels may have different endorsement policies. Endorsed transactions are forward by the client application to ordering service 610.

The ordering service 610 accepts endorsed transactions, orders them into a block, and delivers the blocks to the committing peers. For example, the ordering service 610 may initiate a new block when a threshold of transactions has been reached, a timer times out, or another condition. In the example of FIG. 6A, blockchain node 612 is a committing peer that has received a new data new data block 630 for storage on blockchain 620. The first block in the blockchain may be referred to as a genesis block which includes information about the blockchain, its members, the data stored therein, etc.

The ordering service 610 may be made up of a cluster of orderers. The ordering service 610 does not process transactions, smart contracts, or maintain the shared ledger. Rather, the ordering service 610 may accept the endorsed transactions and specifies the order in which those transactions are committed to the distributed ledger 620. The architecture of the blockchain network may be designed such that the specific implementation of 'ordering' (e.g., Solo, Kafka, BFT, etc.) becomes a pluggable component.

Transactions are written to the distributed ledger 620 in a consistent order. The order of transactions is established to ensure that the updates to the state database 624 are valid when they are committed to the network. Unlike a cryptocurrency blockchain system (e.g., Bitcoin, etc.) where ordering occurs through the solving of a cryptographic puzzle, or mining, in this example the parties of the distributed ledger 620 may choose the ordering mechanism that best suits that network.

When the ordering service 610 initializes a new data block 630, the new data block 630 may be broadcast to committing peers (e.g., blockchain nodes 611, 612, and 613). In response, each committing peer validates the transaction within the new data block 630 by checking to make sure that the read set and the write set still match the current world state in the state database 624. Specifically, the committing peer can determine whether the read data that existed when the endorsers simulated the transaction is identical to the current world state in the state database 624. When the committing peer validates the transaction, the transaction is written to the blockchain 622 on the distributed ledger 620, and the state database 624 is updated with the write data from the read-write set. If a transaction fails, that is, if the committing peer finds that the read-write set does not match the current world state in the state database 624, the transaction ordered into a block may still be included in that block, but it may be marked as invalid, and the state database 624 may not be updated.

Referring to FIG. 6B, a new data block 630 (also referred to as a data block) that is stored on the blockchain 622 of the distributed ledger 620 may include multiple data segments such as a block header 640, block data 650, and block metadata 660. It should be appreciated that the various depicted blocks and their contents, such as new data block 630 and its contents. Shown in FIG. 6B are merely examples and are not meant to limit the scope of the example embodiments. The new data block 630 may store transactional information of N transaction(s) (e.g., 1, 10, 100, 500, 1000, 2000, 3000, etc.) within the block data 650. The new data block 630 may also include a link to a previous block (e.g., on the blockchain 622 in FIG. 6A) within the block header 640. In particular, the block header 640 may include a hash of a previous block's header. The block header 640 may also include a unique block number, a hash of the block data 650 of the new data block 630, and the like. The block number of the new data block 630 may be unique and assigned in various orders, such as an incremental/sequential order starting from zero.

The block data 650 may store transactional information of each transaction that is recorded within the new data block 630. For example, the transaction data may include one or more of a type of the transaction, a version, a timestamp, a channel ID of the distributed ledger 620, a transaction ID, an epoch, a payload visibility, a chaincode path (deploy tx), a chaincode name, a chaincode version, input (chaincode and functions), a client (creator) identify such as a public key and certificate, a signature of the client, identities of endorsers, endorser signatures, a proposal hash, chaincode events, response status, namespace, a read set (list of key and version read by the transaction, etc.), a write set (list of key and value, etc.), a start key, an end key, a list of keys, a Merkel tree query summary, and the like. The transaction data may be stored for each of the N transactions.

In some embodiments, the block data 650 may also store new data 662 which adds additional information to the hash-linked chain of blocks in the blockchain 622. The additional information includes one or more of the steps, features, processes and/or actions described or depicted herein. Accordingly, the new data 662 can be stored in an immutable log of blocks on the distributed ledger 620. Some of the benefits of storing such new data 662 are reflected in the various embodiments disclosed and depicted herein. Although in FIG. 6B the new data 662 is depicted in the block data 650 but may also be located in the block header 640 or the block metadata 660. The new data 662 may include a document composite key that is used for linking the documents within an organization.

The block metadata 660 may store multiple fields of metadata (e.g., as a byte array, etc.). Metadata fields may include signature on block creation, a reference to a last configuration block, a transaction filter identifying valid and invalid transactions within the block, last offset persisted of an ordering service that ordered the block, and the like. The signature, the last configuration block, and the orderer metadata may be added by the ordering service 610. Meanwhile, a committer of the block (such as blockchain node 612) may add validity/invalidity information based on an endorsement policy, verification of read/write sets, and the like. The transaction filter may include a byte array of a size equal to the number of transactions in the block data 650 and a validation code identifying whether a transaction was valid/invalid.

Figure 6C:
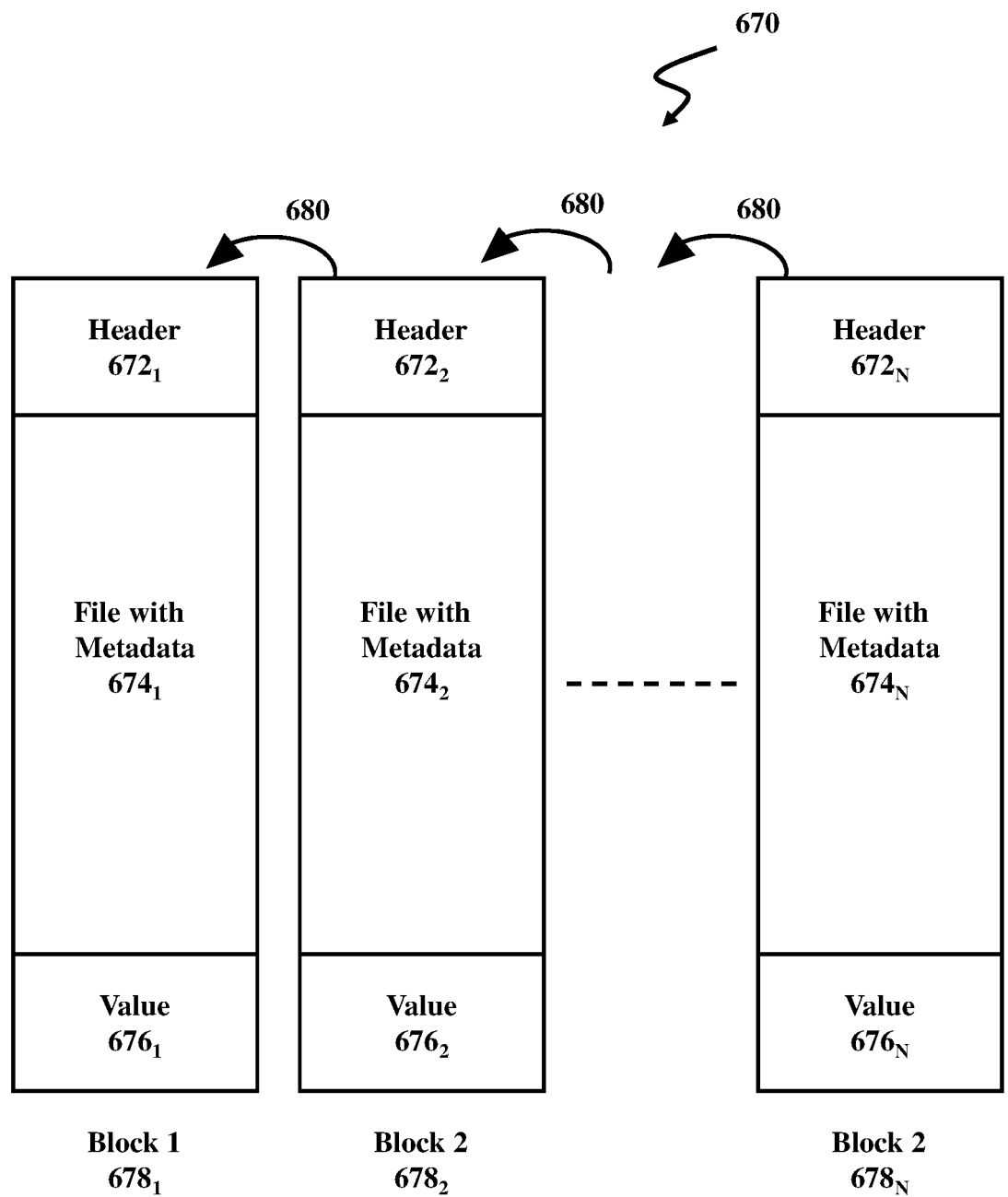
FIG. 6C illustrates a blockchain for digital content, according to example embodiments.

FIG. 6C illustrates an embodiment of a blockchain 670 for digital content in accordance with the embodiments described herein. The digital content may include one or more files and associated information. The files may include media, images, video, audio, text, links, graphics, animations, web pages, documents, or other forms of digital content. The immutable, append-only aspects of the blockchain serve as a safeguard to protect the integrity, validity, and authenticity of the digital content, making it suitable use in legal proceedings where admissibility rules apply or other settings where evidence is taken in to consideration or where the presentation and use of digital information is otherwise of interest. In this case, the digital content may be referred to as digital evidence.

The blockchain may be formed in various ways. In some embodiments, the digital content may be included in and accessed from the blockchain itself. For example, each block of the blockchain may store a hash value of reference information (e.g., header, value, etc.) along the associated digital content. The hash value and associated digital content may then be encrypted together. Thus, the digital content of each block may be accessed by decrypting each block in the blockchain, and the hash value of each block may be used as a basis to reference a previous block. This may be illustrated as follows:

| Block 1 | Block 2 | ... | Block N |
|---|---|---|---|
| Hash Value 1 | Hash Value 2 | | Hash Value N |
| Digital Content 1 | Digital Content 2 | | Digital Content N |

In some embodiments, the digital content may be not included in the blockchain. For example, the blockchain may store the encrypted hashes of the content of each block without any of the digital content. The digital content may be stored in another storage area or memory address in association with the hash value of the original file. The other storage area may be the same storage device used to store the blockchain or may be a different storage area or even a separate relational database. The digital content of each block may be referenced or accessed by obtaining or querying the hash value of a block of interest and then looking up that has value in the storage area, which is stored in correspondence with the actual digital content. This operation may be performed, for example, a database gatekeeper. This may be illustrated as follows:

| Blockchain | Storage Area |
|---|---|
| Block 1 Hash Value | Block 1 Hash Value . . . Content |
| . | . |
| . | . |
| . | . |
| Block N Hash Value | Block N Hash Value . . . Content |

In the example embodiment of FIG. 6C, the blockchain 670 includes a number of blocks $678_1$, $678_2$, . . . $678_N$ cryptographically linked in an ordered sequence, where N≥1. The encryption used to link the blocks $678_1$, $678_2$, . . . $678_N$ may be any of a number of keyed or un-keyed Hash functions. In some embodiments, the blocks $678_1$, $678_2$, . . . $678_N$ are subject to a hash function which produces n-bit alphanumeric outputs (where n is 256 or another number) from inputs that are based on information in the blocks. Examples of such a hash function include, but are not limited to, a SHA-type (SHA stands for Secured Hash Algorithm) algorithm, Merkle-Damgard algorithm, HAIFA algorithm, Merkle-tree algorithm, nonce-based algorithm, and a non-collision-resistant PRF algorithm. In other embodiments, the blocks $678_1$, $678_2$, . . . , $678_N$ may be cryptographically linked by a function that is different from a hash function. For purposes of illustration, the following description is made with reference to a hash function, e.g., SHA-2.

Each of the blocks $678_1$, $678_2$, . . . , $678_N$ in the blockchain includes a header, a version of the file, and a value. The header and the value are different for each block as a result of hashing in the blockchain. In some embodiments, the value may be included in the header. As described in greater detail below, the version of the file may be the original file or a different version of the original file.

The first block $678_1$ in the blockchain is referred to as the genesis block and includes the header $672_1$, original file $674_1$, and an initial value $676_1$. The hashing scheme used for the genesis block, and indeed in all subsequent blocks, may vary. For example, all the information in the first block $678_1$ may be hashed together and at one time, or each or a portion of the information in the first block $678_1$ may be separately hashed and then a hash of the separately hashed portions may be performed.

The header $672_1$ may include one or more initial parameters, which, for example, may include a version number, timestamp, nonce, root information, difficulty level, consensus protocol, duration, media format, source, descriptive keywords, and/or other information associated with original file $674_1$ and/or the blockchain. The header $672_1$ may be generated automatically (e.g., by blockchain network managing software) or manually by a blockchain participant.

Unlike the header in other blocks $678_2$ to $678_N$ in the blockchain, the header $672_1$ in the genesis block does not reference a previous block, simply because there is no previous block.

The original file $674_1$ in the genesis block may be, for example, data as captured by a device with or without processing prior to its inclusion in the blockchain. The original file $674_1$ is received through the interface of the system from the device, media source, or node. The original file $674_1$ is associated with metadata, which, for example, may be generated by a user, the device, and/or the system processor, either manually or automatically. The metadata may be included in the first block $678_1$ in association with the original file $674_1$.

The value $676_1$ in the genesis block is an initial value generated based on one or more unique attributes of the original file $674_1$. In some embodiments, the one or more unique attributes may include the hash value for the original file $674_1$, metadata for the original file $674_1$, and other information associated with the file. In one implementation, the initial value $676_1$ may be based on the following unique attributes:

1) SHA-2 computed hash value for the original file
2) originating device ID
3) starting timestamp for the original file
4) initial storage location of the original file
5) blockchain network member ID for software to currently control the original file and associated metadata The other blocks $678_2$ to $678_N$ in the blockchain also have headers, files, and values. However, unlike header $672_1$ the first block, each of the headers $672_2$ to $672_N$ in the other blocks includes the hash value of an immediately preceding block. The hash value of the immediately preceding block may be just the hash of the header of the previous block or may be the hash value of the entire previous block. By including the hash value of a preceding block in each of the remaining blocks, a trace can be performed from the Nth block back to the genesis block (and the associated original file) on a block-by-block basis, as indicated by arrows 680, to establish an auditable and immutable chain-of-custody.

Each of the header $672_2$ to $672_N$ in the other blocks may also include other information, e.g., version number, timestamp, nonce, root information, difficulty level, consensus protocol, and/or other parameters or information associated with the corresponding files and/or the blockchain in general.

The files $674_2$ to $674_N$ in the other blocks may be equal to the original file or may be a modified version of the original file in the genesis block depending, for example, on the type of processing performed. The type of processing performed may vary from block to block. The processing may involve, for example, any modification of a file in a preceding block, such as redacting information or otherwise changing the content of, taking information away from, or adding or appending information to the files.

Additionally, or alternatively, the processing may involve merely copying the file from a preceding block, changing a storage location of the file, analyzing the file from one or more preceding blocks, moving the file from one storage or memory location to another, or performing action relative to the file of the blockchain and/or its associated metadata. Processing which involves analyzing a file may include, for example, appending, including, or otherwise associating various analytics, statistics, or other information associated with the file.

The values in each of the other blocks $676_2$ to $676_N$ in the other blocks are unique values and are all different as a result of the processing performed. For example, the value in any one block corresponds to an updated version of the value in the previous block. The update is reflected in the hash of the block to which the value is assigned. The values of the blocks therefore provide an indication of what processing was performed in the blocks and also permit a tracing through the blockchain back to the original file. This tracking confirms the chain-of-custody of the file throughout the entire blockchain.

For example, consider the case where portions of the file in a previous block are redacted, blocked out, or pixelated in order to protect the identity of a person shown in the file. In this case, the block including the redacted file may include metadata associated with the redacted file, e.g., how the redaction was performed, who performed the redaction, timestamps where the redaction(s) occurred, etc. The metadata may be hashed to form the value. Because the metadata for the block is different from the information that was hashed to form the value in the previous block, the values are different from one another and may be recovered when decrypted.

In some embodiments, the value of a previous block may be updated (e.g., a new hash value computed) to form the value of a current block when any one or more of the following occurs. The new hash value may be computed by hashing all or a portion of the information noted below, in this example embodiment.

a) new SHA-2 computed hash value if the file has been processed in any way (e.g., if the file was redacted, copied, altered, accessed, or some other action was taken)
b) new storage location for the file
c) new metadata identified associated with the file
d) transfer of access or control of the file from one blockchain participant to another blockchain participant FIG. 6D illustrates an embodiment of a block which may represent the structure of the blocks in the blockchain 690 in accordance with one embodiment. The block, $Block_i$, includes a header $672_i$, a file $674_i$, and a value $676_i$.

The header $672_i$ includes a hash value of a previous block $Block_{i-1}$ and additional reference information, which, for example, may be any of the types of information (e.g., header information including references, characteristics, parameters, etc.) discussed herein. All blocks reference the hash of a previous block except, of course, the genesis block. The hash value of the previous block may be just a hash of the header in the previous block or a hash of all or a portion of the information in the previous block, including the file and metadata.

The file $674_i$ includes a plurality of data, such as Data 1, Data 2, ..., Data N in sequence. The data are tagged with Metadata 1, Metadata 2, ..., Metadata N which describe the content and/or characteristics associated with the data. For example, the metadata for each data may include information to indicate a timestamp for the data, process the data, keywords indicating the persons or other content depicted in the data, and/or other features that may be helpful to establish the validity and content of the file as a whole, and particularly its use a digital evidence, for example, as described in connection with an embodiment discussed below. In addition to the metadata, each data may be tagged with reference $REF_1$, $REF_2$, $REF_N$ to a previous data to prevent tampering, gaps in the file, and sequential reference through the file.

Once the metadata is assigned to the data (e.g., through a smart contract), the metadata cannot be altered without the hash changing, which can easily be identified for invalidation. The metadata, thus, creates a data log of information that may be accessed for use by participants in the blockchain.

The value $676_i$ is a hash value or other value computed based on any of the types of information previously discussed. For example, for any given block Block$_i$, the value for that block may be updated to reflect the processing that was performed for that block, e.g., new hash value, new storage location, new metadata for the associated file, transfer of control or access, identifier, or other action or information to be added. Although the value in each block is shown to be separate from the metadata for the data of the file and header, the value may be based, in part or whole, on this metadata in another embodiment.

Once the blockchain 670 is formed, at any point in time, the immutable chain-of-custody for the file may be obtained by querying the blockchain for the transaction history of the values across the blocks. This query, or tracking procedure, may begin with decrypting the value of the block that is most currently included (e.g., the last ($N^{th}$) block), and then continuing to decrypt the value of the other blocks until the genesis block is reached and the original file is recovered. The decryption may involve decrypting the headers and files and associated metadata at each block, as well.

Decryption is performed based on the type of encryption that took place in each block. This may involve the use of private keys, public keys, or a public key-private key pair. For example, when asymmetric encryption is used, blockchain participants or a processor in the network may generate a public key and private key pair using a predetermined algorithm. The public key and private key are associated with each other through some mathematical relationship. The public key may be distributed publicly to serve as an address to receive messages from other users, e.g., an IP address or home address. The private key is kept secret and used to digitally sign messages sent to other blockchain participants. The signature is included in the message so that the recipient can verify using the public key of the sender. This way, the recipient can be sure that only the sender may have sent this message.

Generating a key pair may be analogous to creating an account on the blockchain, but without having to actually register anywhere. Also, every transaction that is executed on the blockchain is digitally signed by the sender using their private key. This signature ensures that only the owner of the account can track and process (if within the scope of permission determined by a smart contract) the file of the blockchain.

Figure 7A:
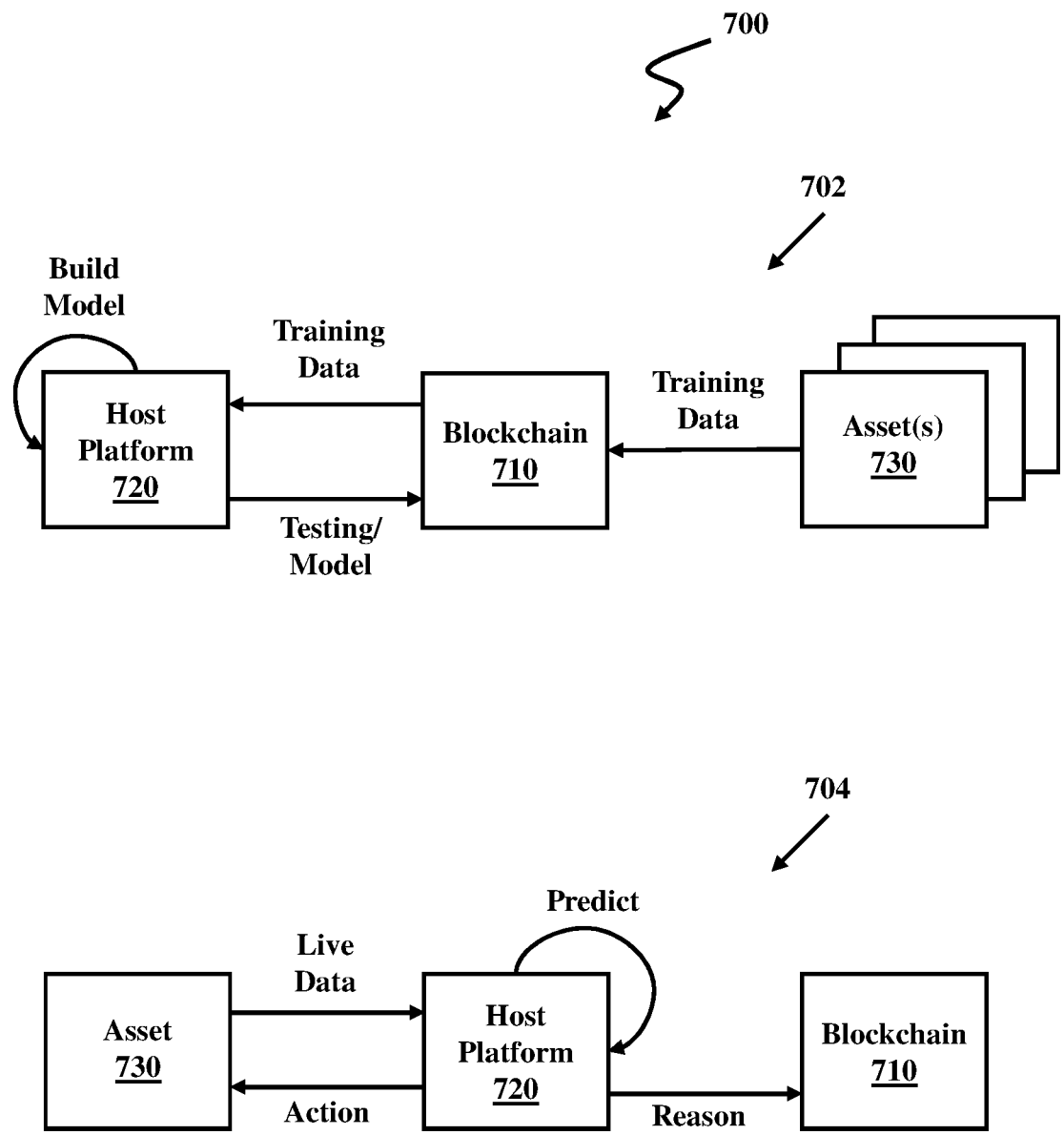
FIG. 7A illustrates an example blockchain which stores machine learning (artificial intelligence) data, according to example embodiments.
Figure 7B:
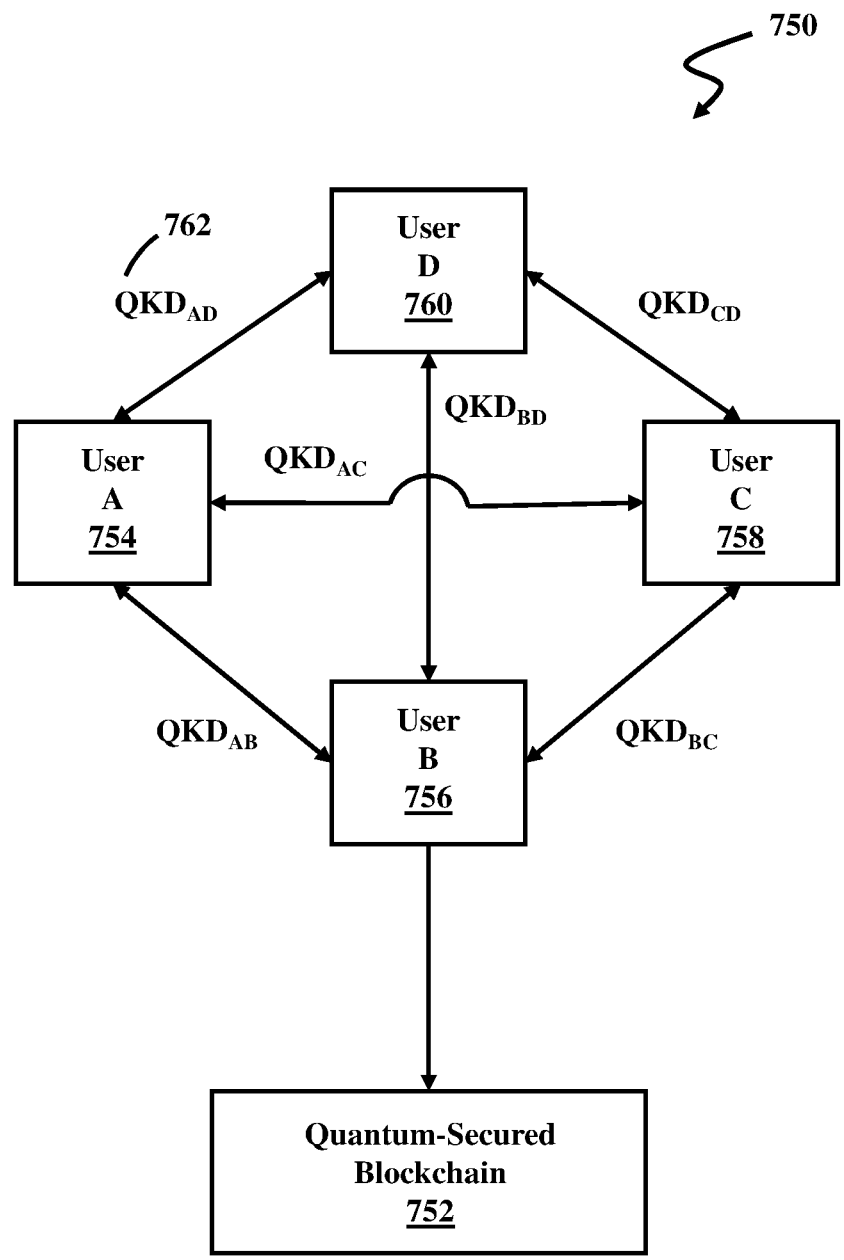
FIG. 7B illustrates an example quantum-secure blockchain, according to example embodiments.

FIGS. 7A and 7B illustrate additional examples of use cases for blockchain which may be incorporated and used herein. In particular, FIG. 7A illustrates an example 700 of a blockchain 710 which stores machine learning (artificial intelligence) data. Machine learning relies on vast quantities of historical data (or training data) to build predictive models for accurate prediction on new data. Machine learning software (e.g., neural networks, etc.) can often sift through millions of records to unearth non-intuitive patterns.

In the example of FIG. 7A, a host platform 720 builds and deploys a machine learning model for predictive monitoring of assets 730. Here, the host platform 720 may be a cloud platform, an industrial server, a web server, a personal computer, a user device, and the like. Assets 730 can be any type of asset (e.g., machine or equipment, etc.) such as an aircraft, locomotive, turbine, medical machinery and equipment, oil and gas equipment, boats, ships, vehicles, and the like. As another example, assets 730 may be non-tangible assets such as stocks, currency, digital coins, insurance, or the like.

The blockchain 710 can be used to significantly improve both a training process 702 of the machine learning model and a predictive process 704 based on a trained machine learning model. For example, in 702, rather than requiring a data scientist/engineer or other user to collect the data, historical data may be stored by the assets 730 themselves (or through an intermediary, not shown) on the blockchain 710. This can significantly reduce the collection time needed by the host platform 720 when performing predictive model training. For example, using smart contracts, data can be directly and reliably transferred straight from its place of origin to the blockchain 710. By using the blockchain 710 to ensure the security and ownership of the collected data, smart contracts may directly send the data from the assets to the individuals that use the data for building a machine learning model. This allows for sharing of data among the assets 730.

The collected data may be stored in the blockchain 710 based on a consensus mechanism. The consensus mechanism pulls in (permissioned nodes) to ensure that the data being recorded is verified and accurate. The data recorded is time-stamped, cryptographically signed, and immutable. It is therefore auditable, transparent, and secure. Adding IoT devices which write directly to the blockchain can, in certain cases (i.e. supply chain, healthcare, logistics, etc.), increase both the frequency and accuracy of the data being recorded.

Furthermore, training of the machine learning model on the collected data may take rounds of refinement and testing by the host platform 720. Each round may be based on additional data or data that was not previously considered to help expand the knowledge of the machine learning model. In 702, the different training and testing steps (and the data associated therewith) may be stored on the blockchain 710 by the host platform 720. Each refinement of the machine learning model (e.g., changes in variables, weights, etc.) may be stored on the blockchain 710. This provides verifiable proof of how the model was trained and what data was used to train the model. Furthermore, when the host platform 720 has achieved a finally trained model, the resulting model may be stored on the blockchain 710.

After the model has been trained, it may be deployed to a live environment where it can make predictions/decisions based on the execution of the final trained machine learning model. For example, in 704, the machine learning model may be used for condition-based maintenance (CBM) for an asset such as an aircraft, a wind turbine, a healthcare machine, and the like. In this example, data fed back from the asset 730 may be input the machine learning model and used to make event predictions such as failure events, error codes, and the like. Determinations made by the execution of the machine learning model at the host platform 720 may be stored on the blockchain 710 to provide auditable/verifiable proof. As one non-limiting example, the machine learning model may predict a future breakdown/failure to a part of the asset 730 and create alert or a notification to replace the part. The data behind this decision may be stored by the host platform 720 on the blockchain 710. In one embodiment the features and/or the actions described and/or depicted herein can occur on or with respect to the blockchain 710.

New transactions for a blockchain can be gathered together into a new block and added to an existing hash value. This is then encrypted to create a new hash for the new block. This is added to the next list of transactions when they are encrypted, and so on. The result is a chain of blocks that each contain the hash values of all preceding blocks. Computers that store these blocks regularly compare their hash values to ensure that they are all in agreement. Any computer that does not agree, discards the records that are causing the problem. This approach is good for ensuring tamper-resistance of the blockchain, but it is not perfect.

One way to game this system is for a dishonest user to change the list of transactions in their favor, but in a way that leaves the hash unchanged. This can be done by brute force, in other words by changing a record, encrypting the result, and seeing whether the hash value is the same. And if not, trying again and again and again until it finds a hash that matches. The security of blockchains is based on the belief that ordinary computers can only perform this kind of brute force attack over time scales that are entirely impractical, such as the age of the universe. By contrast, quantum computers are much faster (1000s of times faster) and consequently pose a much greater threat.

FIG. 7B illustrates an example 750 of a quantum-secure blockchain 752 which implements quantum key distribution (QKD) to protect against a quantum computing attack. In this example, blockchain users can verify each other's identities using QKD. This sends information using quantum particles such as photons, which cannot be copied by an eavesdropper without destroying them. In this way, a sender and a receiver through the blockchain can be sure of each other's identity.

In the example of FIG. 7B, four users are present 754, 756, 758, and 760. Each of pair of users may share a secret key 762 (i.e., a QKD) between themselves. Since there are four nodes in this example, six pairs of nodes exist, and therefore six different secret keys 762 are used including $QKD_{AB}$, $QKD_{AC}$, $QKD_{AD}$, $QKD_{BC}$, $QKD_{BD}$, and $QKD_{CD}$. Each pair can create a QKD by sending information using quantum particles such as photons, which cannot be copied by an eavesdropper without destroying them. In this way, a pair of users can be sure of each other's identity.

The operation of the blockchain 752 is based on two procedures (i) creation of transactions, and (ii) construction of blocks that aggregate the new transactions. New transactions may be created similar to a traditional blockchain network. Each transaction may contain information about a sender, a receiver, a time of creation, an amount (or value) to be transferred, a list of reference transactions that justifies the sender has funds for the operation, and the like. This transaction record is then sent to all other nodes where it is entered into a pool of unconfirmed transactions. Here, two parties (i.e., a pair of users from among 754-760) authenticate the transaction by providing their shared secret key 762 (QKD). This quantum signature can be attached to every transaction making it exceedingly difficult to tamper with. Each node checks their entries with respect to a local copy of the blockchain 752 to verify that each transaction has sufficient funds. However, the transactions are not yet confirmed.

Rather than perform a traditional mining process on the blocks, the blocks may be created in a decentralized manner using a broadcast protocol. At a predetermined period of time (e.g., seconds, minutes, hours, etc.) the network may apply the broadcast protocol to any unconfirmed transaction thereby to achieve a Byzantine agreement (consensus) regarding a correct version of the transaction. For example, each node may possess a private value (transaction data of that particular node). In a first round, nodes transmit their private values to each other. In subsequent rounds, nodes communicate the information they received in the previous round from other nodes. Here, honest nodes are able to create a complete set of transactions within a new block. This new block can be added to the blockchain 752. In one embodiment the features and/or the actions described and/or depicted herein can occur on or with respect to the blockchain 752.

Figure 8:
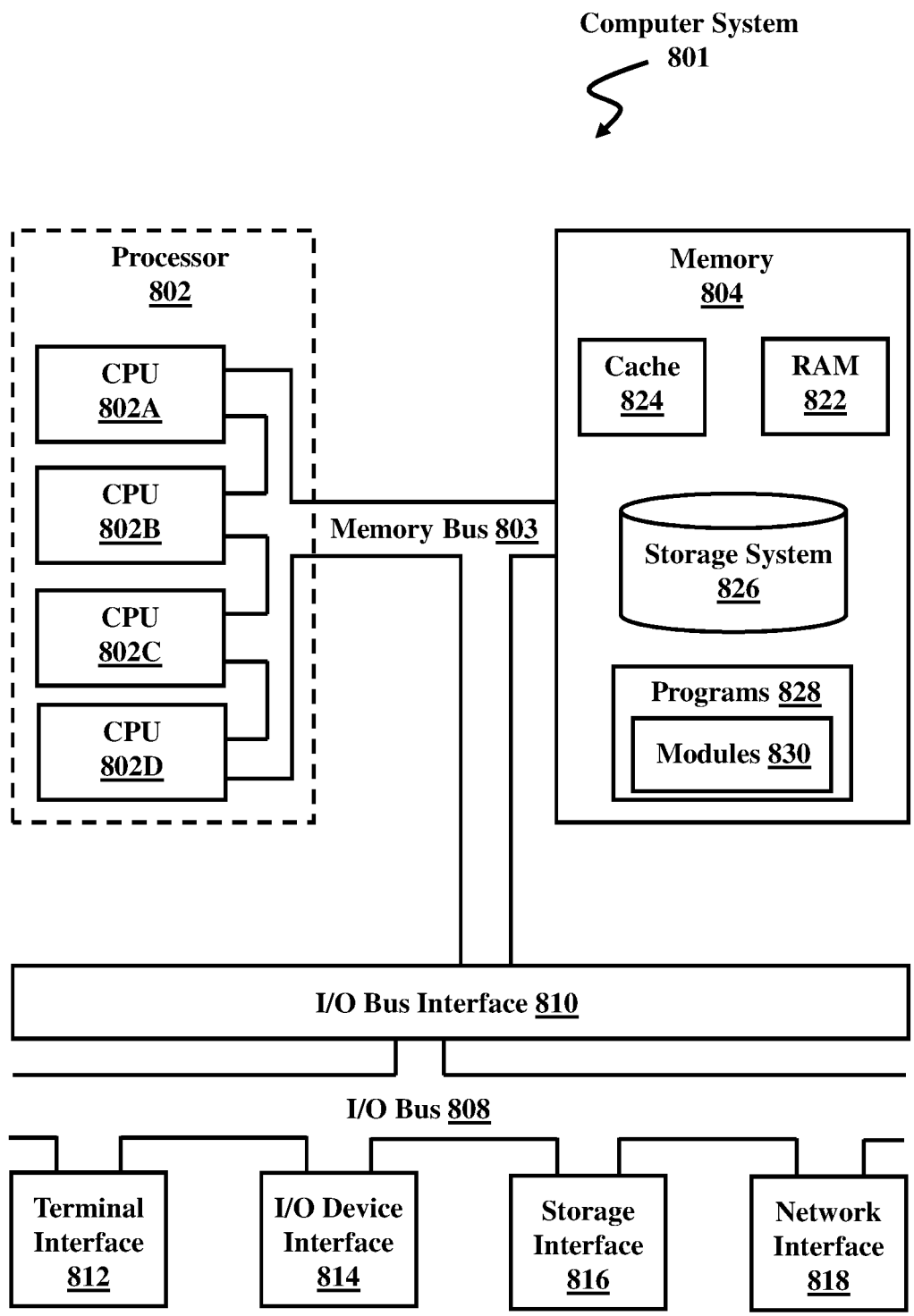
FIG. 8 illustrates a high-level block diagram of an example computer system that may be used in implementing one or more of the methods, tools, and modules, and any related functions, described herein, in accordance with embodiments of the present disclosure.

Referring now to FIG. 8, shown is a high-level block diagram of an example computer system 801 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 801 may comprise one or more CPUs 802, a memory subsystem 804, a terminal interface 812, a storage interface 816, an I/O (Input/Output) device interface 814, and a network interface 818, all of which may be communicatively coupled, directly or indirectly, for inter-component communication via a memory bus 803, an I/O bus 808, and an I/O bus interface unit 810.

The computer system 801 may contain one or more general-purpose programmable central processing units (CPUs) 802A, 802B, 802C, and 802D, herein generically referred to as the CPU 802. In some embodiments, the computer system 801 may contain multiple processors typical of a relatively large system; however, in other embodiments the computer system 801 may alternatively be a single CPU system. Each CPU 802 may execute instructions stored in the memory subsystem 804 and may include one or more levels of on-board cache.

System memory 804 may include computer system readable media in the form of volatile memory, such as random access memory (RAM) 822 or cache memory 824. Computer system 801 may further include other removable/non-removable, volatile/non-volatile computer system storage media. By way of example only, storage system 826 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 804 can include flash memory, e.g., a flash memory stick drive or a flash drive. Memory devices can be connected to memory bus 803 by one or more data media interfaces. The memory 804 may include at least one program product having a set (e.g., at least one) of program modules that are configured to carry out the functions of various embodiments.

One or more programs/utilities 828, each having at least one set of program modules 830 may be stored in memory 804. The programs/utilities 828 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 828 and/or program modules 830 generally perform the functions or methodologies of various embodiments.

Although the memory bus 803 is shown in FIG. 8 as a single bus structure providing a direct communication path among the CPUs 802, the memory subsystem 804, and the I/O bus interface 810, the memory bus 803 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 810 and the I/O bus 808 are shown as single respective units, the computer system 801 may, in some embodiments, contain multiple I/O bus interface units 810, multiple I/O buses 808, or both. Further, while multiple I/O interface units are shown, which separate the I/O bus 808 from various communications paths running to the various I/O devices, in other embodiments some or all of the I/O devices may be connected directly to one or more system I/O buses.

In some embodiments, the computer system 801 may be a multi-user mainframe computer system, a single-user system, or a server computer or similar device that has little or no direct user interface, but receives requests from other computer systems (clients). Further, in some embodiments, the computer system 801 may be implemented as a desktop computer, portable computer, laptop or notebook computer, tablet computer, pocket computer, telephone, smartphone, network switches or routers, or any other appropriate type of electronic device.

It is noted that FIG. 8 is intended to depict the representative major components of an exemplary computer system 801. In some embodiments, however, individual components may have greater or lesser complexity than as represented in FIG. 8, components other than or in addition to those shown in FIG. 8 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

The invention claimed is:

1. A system, comprising:
a processor;
  a memory on which are stored machine readable instructions that, when executed by the processor, cause the processor to:
    receive a first set of annotation information;
    run a consensus algorithm to determine a consensus of authorized manager nodes on a blockchain network;
    determine, based on a result of the consensus algorithm, a first approval decision for the first set of annotation information,
      wherein the approval decision is an indication of an approve or deny query for a majority of the authorized manager nodes on the first set of annotation information;
    record the first approval decision in the blockchain;
    retrieve a first set of approval decisions from the blockchain, wherein the first set of approval decisions includes the first approval decision;
    generate the consensus based on the first set of approval decisions; and
    record the consensus in the blockchain.

2. The system of claim 1, wherein the instructions further cause the processor to tag the consensus with a domain.

3. The system of claim 2, wherein the instructions further cause the processor retrieve a second set of annotation information, wherein the approval decision is further based on the second set of annotation information.

4. The system of claim 1, wherein the instructions further cause the processor to:
  retrieve a second set of approval decisions from the blockchain; and
  generate an updated consensus based on the first set of approval decisions and the second set of approval decisions; and
  record the updated consensus in the blockchain.

5. The system of claim 1, wherein determining further includes querying a user for the approval decision.

6. The system of claim 1, wherein the instructions further cause the processor to retrieve a document associated with the first set of annotation information from a distributed file storage.

7. The system of claim 1, wherein the instructions further cause the processor to store a document associated with the annotation information in a distributed file storage.

8. A method, comprising:
receiving a first set of annotation information;
running a consensus algorithm to determine a consensus of authorized manager nodes on a blockchain network;
determining, based on a result of the consensus algorithm, a first approval decision for the first set of annotation information,
  wherein the approval decision is an indication of an approve or deny query for a majority of the authorized manager nodes on the first set of annotation information;
recording the first approval decision in a blockchain;
retrieving a first set of approval decisions from the blockchain;
generating the consensus based on the first set of approval decisions; and
recording the consensus in the blockchain.

9. The method of claim 8,
wherein the first set of annotations information is received from a first annotator, and
wherein the first set of approval decisions is generated by a first set of managers.

10. The method of claim 9 further comprising, scoring the first annotator based on an approval rate of the first set of managers for the first annotator.

11. The method of claim 10, wherein the first set of managers are of a specific domain and the scoring is for the specific domain.

12. The method of claim 9 further comprising:
scoring the first annotator based on an average consensus, wherein the average consensus is an average of the consensus and one or more other consensuses for the annotations of the first annotator.

13. The method of claim 8, further comprising:
retrieving a second set of approval decisions from the blockchain;
generating an updated consensus based on the first set of approval decisions and the second set of approval decisions; and
recording the updated consensus in the blockchain.

14. A computer program product, the computer program product comprising a non-transitory computer readable storage medium having program instructions embodied therewith, the program instructions executable by a processor to cause the processor to:
receive a first set of annotation information;
run a consensus algorithm to determine a consensus of authorized manager nodes on a blockchain network;
determine, based on a result of the consensus algorithm, a first approval decision for the first set of annotation information, wherein the approval decision is an indication of an approve or deny query for a majority of the authorized manager nodes on the first set of annotation information;
record the first approval decision in the blockchain;
retrieve a first set of approval decisions from the blockchain, wherein the first set of approval decisions includes the first approval decision;
generate the consensus based on the first set of approval decisions; and
record the consensus in the blockchain.

15. The computer program product of claim 14, wherein the instructions further cause the processor to tag the consensus with a domain.

16. The computer program product of claim 15, wherein the instructions further cause the processor retrieve a second set of annotation information, wherein the approval decision is further based on the second set of annotation information.

17. The computer program product of claim 14, wherein the instructions further cause the processor to:
retrieve a second set of approval decisions from the blockchain; and
generate an updated consensus based on the first set of approval decisions and the second set of approval decisions; and
record the updated consensus in the blockchain.

18. The computer program product of claim 14, wherein determining further includes querying a user for the approval decision.

19. The computer program product of claim 14, wherein the instructions further cause the processor to retrieve a document associated with the first set of annotation information from a distributed file storage.

20. The computer program product of claim 14, wherein the instructions further cause the processor to store a document associated with the annotation information in a distributed file storage.

* * * * *